US008239276B2

(12) United States Patent
Lin et al.

(10) Patent No.: US 8,239,276 B2
(45) Date of Patent: Aug. 7, 2012

(54) ON-THE-GO SHOPPING LIST

(75) Inventors: Gloria Lin, San Ramon, CA (US); Amir Mahmood Mikhak, Cambridge, MA (US)

(73) Assignee: Apple Inc., Cupertino, CA (US)

(*) Notice: Subject to any disclaimer, the term of this patent is extended or adjusted under 35 U.S.C. 154(b) by 500 days.

(21) Appl. No.: 12/286,361

(22) Filed: Sep. 30, 2008

(65) Prior Publication Data

US 2010/0082447 A1    Apr. 1, 2010

(51) Int. Cl.
G06Q 30/00 (2006.01)
G06F 17/30 (2006.01)
(52) U.S. Cl. ............... 705/26.1; 705/26.9; 705/27.1
(58) Field of Classification Search ............ 705/26–27
See application file for complete search history.

(56) References Cited

U.S. PATENT DOCUMENTS

| | | | |
|---|---|---|---|
| 4,701,601 A | 10/1987 | Francini et al. | |
| 4,868,376 A | 9/1989 | Lessin et al. | |
| 4,929,819 A | 5/1990 | Collins, Jr. | |
| 5,239,167 A | 8/1993 | Kipp | |
| 5,276,311 A | 1/1994 | Hennige | |
| 5,540,301 A | 7/1996 | Dumont | |
| 5,917,913 A | 6/1999 | Wang | |
| 6,175,922 B1 | 1/2001 | Wang | |
| 6,400,270 B1 | 6/2002 | Person | |
| 6,684,269 B2 | 1/2004 | Wagner | |
| 6,694,387 B2 | 2/2004 | Wagner | |
| 6,910,697 B2 | 6/2005 | Varatharajah et al. | |
| 7,089,214 B2 | 8/2006 | Wang | |
| 7,128,274 B2 | 10/2006 | Kelley et al. | |
| 7,240,036 B1 | 7/2007 | Mamdani et al. | |
| 7,334,728 B2* | 2/2008 | Williams | 235/383 |
| 7,376,591 B2* | 5/2008 | Owens | 705/26 |
| 7,464,050 B1* | 12/2008 | Deaton et al. | 705/26 |
| 2002/0082931 A1* | 6/2002 | Siegel et al. | 705/26 |
| 2002/0178088 A1* | 11/2002 | Lurie et al. | 705/26 |
| 2004/0203352 A1 | 10/2004 | Hall et al. | |
| 2005/0116027 A1 | 6/2005 | Algiene et al. | |
| 2005/0125343 A1 | 6/2005 | Mendelovich | |

(Continued)

FOREIGN PATENT DOCUMENTS

EP          1331561          7/2003

(Continued)

OTHER PUBLICATIONS

"Cairo Launches Online Shopping Resource to Find and Track Local Retail Sales, Saving Consumers Time and Money." Business Wire. Oct. 25, 2004. [recovered from Dialog on Mar. 16, 2012].*

(Continued)

*Primary Examiner* — Will Allen
*Assistant Examiner* — Kathleen G Palavecino
(74) *Attorney, Agent, or Firm* — Fletcher Yoder PC

(57) ABSTRACT

Systems and methods for providing shopping-related information to a consumer are provided. Embodiments of the system allow a consumer to create an electronic shopping list by scanning products. In some embodiments, shopping-related information may be obtained for items in the shopping list, such as pricing information, product quality, consumer ratings, and other information that may help a consumer to make an informed purchasing decision. Other embodiments allow a consumer to obtain and compare retail prices offered by several retailers for products in the shopping list. Still other embodiments provide a store-wide network that allows a shopper to scan items in the store, add the scanned items to a shopping list, and then check-out electronically.

14 Claims, 26 Drawing Sheets

U.S. PATENT DOCUMENTS

| | | | |
|---|---|---|---|
| 2005/0131871 | A1 | 6/2005 | Howard et al. |
| 2005/0160004 | A1* | 7/2005 | Moss et al. ............. 705/14 |
| 2005/0222961 | A1 | 10/2005 | Staib et al. |
| 2006/0111944 | A1 | 5/2006 | Sirmans et al. |
| 2006/0213972 | A1 | 9/2006 | Kelley et al. |
| 2006/0243609 | A1 | 11/2006 | Cole et al. |
| 2006/0266822 | A1 | 11/2006 | Kelley et al. |
| 2006/0287004 | A1 | 12/2006 | Fuqua |
| 2007/0022058 | A1 | 1/2007 | Labrou et al. |
| 2007/0150369 | A1* | 6/2007 | Zivin ............. 705/26 |
| 2007/0190939 | A1 | 8/2007 | Abel |
| 2007/0205275 | A1 | 9/2007 | Nicola et al. |
| 2007/0228179 | A1 | 10/2007 | Atkinson |
| 2007/0235539 | A1 | 10/2007 | Sevanto et al. |
| 2007/0255652 | A1 | 11/2007 | Tumminaro et al. |
| 2007/0265033 | A1 | 11/2007 | Brostrom |
| 2007/0278290 | A1 | 12/2007 | Messerges et al. |
| 2008/0005195 | A1 | 1/2008 | Li |
| 2008/0052243 | A1* | 2/2008 | Narayanaswami et al. ..... 705/64 |
| 2008/0059323 | A1* | 3/2008 | Chang et al. ............. 705/26 |
| 2008/0154734 | A1 | 6/2008 | Fernandez et al. |
| 2010/0082485 | A1 | 4/2010 | Lin et al. |

FOREIGN PATENT DOCUMENTS

| | | |
|---|---|---|
| WO | 2002/008863 | 1/2002 |
| WO | 2008/112497 | 9/2008 |
| WO | 2009/018255 | 2/2009 |

OTHER PUBLICATIONS

NFC Forum; Near Field Communication and the NFC Forum: The Keys to Truly Interoperable Communications; http://www.nfc-forum.org/resources/white_papers/nfc_forum_marketing_white_paper.pdf; Wakefield, MA, USA 2007.

Near Field Communication in the real world part I; Turning the NFC promise into profitable, everyday applications; http://www.nfc-forum.org/resources/white_papers/Innovision_whitePaper1.pdf ; Innovation Research & Technology plc; Gloucestershire, United Kingdom.

Near Field Communication in the real world part II, Using the right NFC tag type for the right NFC application; http://www.nfc-forum.org/resources/white_papers/Innovision_whitePaper2.pdf ; Innovation Research & Technology plc; Gloucestershire, United Kingdom.

Near Field Communication in the real world part III, Moving to System on Chip (SoC) integration; http://www.nfc-forum.org/resources/white_papers/Innovision_whitePaper3.pdf ; Innovation Research & Technology plc; Gloucestershire, United Kingdom 2007.

Ricker Thomas; Nokia's 6212 with Bluetooth NFC: Let the Pairing revolution being!; http://www.engadget.com/2008/04/15/nokias-6212-with-bluetooth-nfc-let-the-pairing-revolution-begi/; Engadget; 2008.

NFC trial in NYC enables merchant and transit payment via cell phones; http://www.contactlessnews.com/2006/12/14/nfc-trial-in-nyc-enables-merchant-and-transit-payments-via-cell-phones; Citi/ATT/MasterCard/Nokia run trial in NYC with MTA et al.; Contactless News; 2008.

Port Authority, NJ Transit to test contactless cards; http://www.contactlessnews.com/2008/02/25/port-authority-nj-transit-to-test-contactless-cards/; Port Authority/NJ Transit run compatible trial with NYC; Contactless News 2008.

Bart NFC trial first to use mobile phones to pay for fares, food; http://www.contactlessnews.com/2008/01/29/bart-nfc-trial-first-to-use-mobile-phones-to-pay-for-fares-food/; Bart et al. run trial for automated food and transit payments; Contactless News 2008.

New NFC trail launched in Spokane; U.S. Bank/Mastercard run trial in Spokane, WA; http://www.contactlessnews.com/2008/1/28/new-nfc-trial-launched-in-spokane/; Contactless News 2008.

K. Penttila, et al.; "Use and interface definition of mobile RFID reader integrated in a smart phone," Consumer Electronics, 2005, Proceedings of the 9th International Symposium on Macau SAR, Jun. 14-16, 2005, IEEE, Jun. 14, 2005, pp. 353-358.

* cited by examiner

ON-THE-GO SHOPPING LIST

BACKGROUND

1. Field of the Invention

Embodiments of the present disclosure relate generally to handheld electronic devices and, more particularly, to systems and methods for conducting shopping-related transactions with a handheld electronic device.

2. Description of the Related Art

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Modern technology offers today's consumers a wide range of tools for interacting in the marketplace. From mail-order catalogs to online shopping, consumers have access to a wide range of information and a broad array of shopping tools for purchasing anything from automobiles to simple groceries. Savy consumers may be able use these shopping tools to get the best deal possible for any number of items. Often times, however, there is so much information available that it may be difficult to separate the useful information from the irrelevant. At other times, a particular shopping tool may not be conveniently accessible at the time the consumer intends to make a purchase. Therefore, despite the wide range of tools and information available, consumers may not always be willing to invest the time and effort required to get the best possible deal.

SUMMARY

Certain aspects of embodiments disclosed herein by way of example are summarized below. It should be understood that these aspects are presented merely to provide the reader with a brief summary of certain forms an invention disclosed and/or claimed herein might take and that these aspects are not intended to limit the scope of any invention disclosed and/or claimed herein. Indeed, any invention disclosed and/or claimed herein may encompass a variety of aspects that may not be set forth below.

The present disclosure generally relates to techniques for executing various shopping related transactions on a mobile electronic device. For example, in some embodiments a mobile electronic device may be used to identify a product and obtain pricing information relevant to retailers of the product within a specified geographical location. In another embodiment, a mobile electronic device may be used to acquire pricing information for a shopping list of products. Embodiments may also include a variety of features that make the shopping experience quick and efficient while allowing the consumer to hunt for a better bargain. Furthermore, several embodiments also allow the product manufacturers and/or retailers to distribute relevant product information to targeted consumers who are known to be, or who may be, interested in buying a particular product.

BRIEF DESCRIPTION OF THE DRAWINGS

These and other features, aspects, and advantages of the present invention will become better understood when the following detailed description of certain exemplary embodiments is read with reference to the accompanying drawings in which like characters represent like parts throughout the drawings, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

It may be advantageous to provide a system and method that allows consumers to quickly and easily obtain highly relevant shopping data, while also allowing retailers and manufacturers to send targeted advertising or other relevant product data to interested consumers. More specifically, it may be advantageous to provide a system and method of using a mobile electronic device to distribute and receive shopping-related information.

Figure 1:
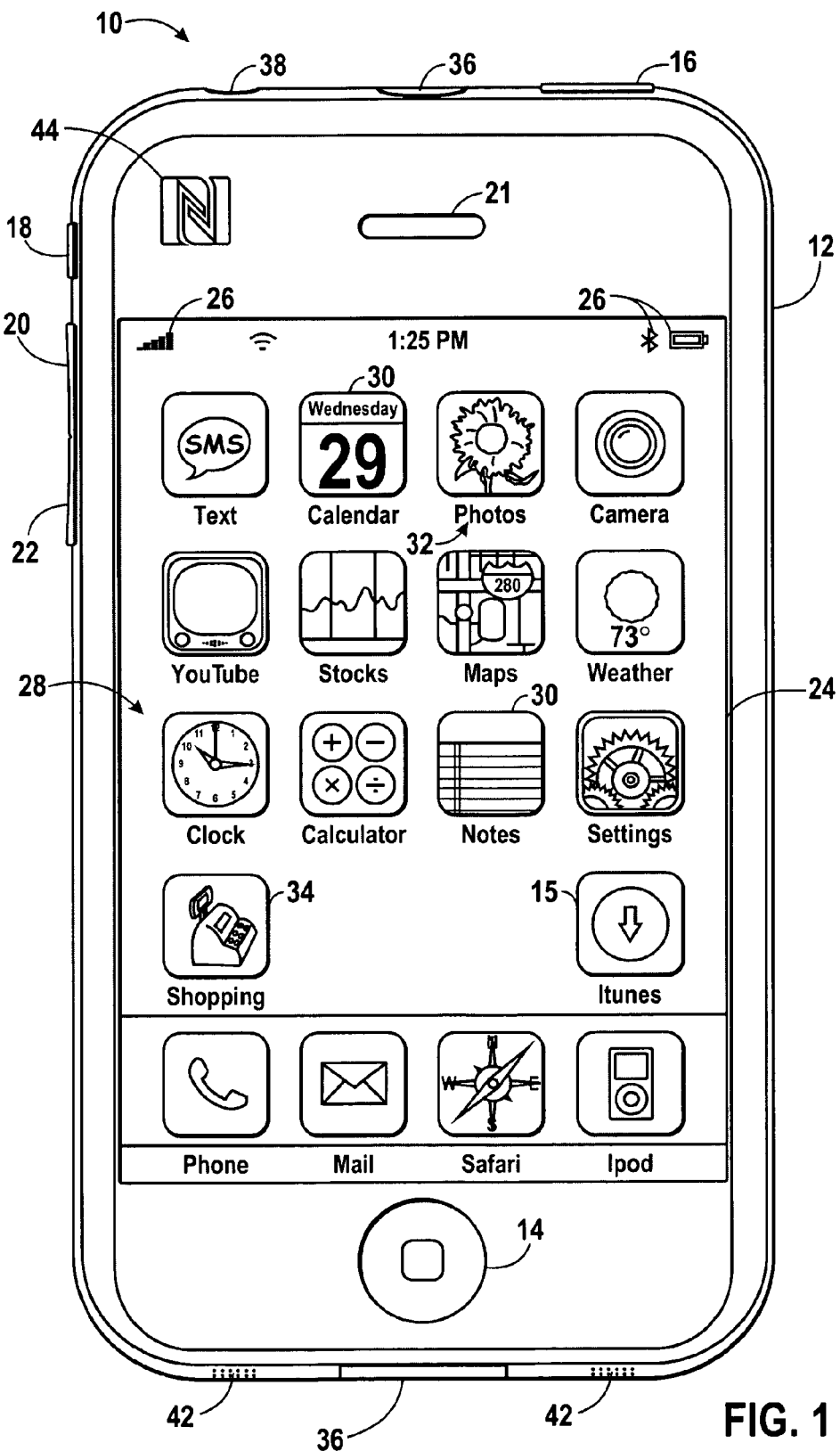
FIG. 1 is a front view of an electronic device in accordance with one embodiment.

FIG. 1 illustrates an electronic device 10 that may include one or more shopping applications for providing the shopping related techniques briefly mentioned above. As illustrated in FIG. 1, the electronic device 10 may be a handheld device incorporating the functionality of one or more portable devices, such as a media player, a cellular phone, a personal data organizer, and so forth. Depending on the functionalities provided by the electronic device 10, the user may listen to music, play games, record video, take pictures, and place telephone calls, while moving freely with the device 10. In addition, the electronic device 10 may allow a user to connect to and communicate through the Internet or through other networks, such as local or wide area networks. For example, the electronic device 10 may allow a user to communicate using e-mail, text messaging, instant messaging, or other forms of electronic communication. The electronic device 10 also may communicate with other devices using short-range connections, such as Bluetooth and near field communication. By way of example, the electronic device 10 may be a model of an iPhone® available from Apple Inc. of Cupertino, Calif.

In the depicted embodiment, the device 10 is enclosed by a casing 12 that protects the interior components from physical damage and shields them from electromagnetic interference. The casing may be formed from any suitable material such as plastic, metal, or a composite. The casing allows access to user input structures 14, 16, 18, 20, and 22 through which a user may interface with the device. Each user input structure 14, 16, 18, 20, and 22 may be configured to control a device function when actuated. For example, the input structure 14 may include a button that when pressed causes a "home" screen or menu to be displayed on the device. The input structure 16 may include a button for toggling the device 10 between a sleep mode and a wake mode. The input structure 18 may include a two-position slider that silences a ringer for the cell phone application. The input structures 20 and 22 may include buttons for increasing and decreasing the volume output of the device 10. In general, the electronic device 10 may include any number of user input structures existing in various forms including buttons, switches, control pads, keys, knobs, scroll wheels, or other suitable forms.

The device 10 also includes a display 24 which may display various images generated by the device. For example, the display 24 may show photos, movies, album art, and/or data, such as text documents, spreadsheets, text messages, and email, among other things. The display 24 also may display system indicators 26 that provide feedback to a user, such as power status, signal strength, call status, external device connection, or the like. The display 24 may be any type of display such as a liquid crystal display (LCD), a light emitting diode (LED) display, an organic light emitting diode (OLED) display, or other suitable display. Additionally, the device 10 may include a touch screen disposed adjacent to the display 24, such that a user may select elements of the display 24 by touching them with the finger or a stylus.

The display 24 may be used to display a GUI 28 that allows a user to interact with the device. The GUI 28 may include various layers, windows, screens, templates, elements, or other components that may be displayed in all of or areas of the display 24. In certain embodiments, the user input structures 14, 16, 18, 20, and 22, may be used to navigate through the GUI 28. For example, the user input structures may include a wheel that allows a user to select graphical elements, shown here as icons 30, of the GUI 28. The icons 30 also may be selected via the touch screen.

The icons 30 may represent various layers, windows, screens, templates, elements, or other components that may be displayed in some or all of the areas of the display 24 upon selection by the user. Furthermore, selection of an icon 30 may lead to a hierarchical navigation process, such that selection of an icon 30 leads to a screen that includes one or more additional icons or other GUI elements. Textual indicators 32 may be displayed on or near the graphical elements 30 to facilitate user interpretation of each graphical element 30. It should be appreciated that the GUI 30 may include various components arranged in hierarchical and/or non-hierarchical structures.

When an icon 30 is selected, the device 10 may be configured to open an application associated with that icon and display a corresponding screen. For example, when the shopping icon 34 is selected, the device 10 may open a shopping program and display a shopping menu displaying the various tools and features available in the shopping program. For each application, screens may be displayed on the display 24 that include various user interface elements.

The electronic device 10 also may include various input/output ports 36, 38, and 40 that allow connection of the device 10 to external devices. For example, the input/output port 36 may be a proprietary connection port for transmitting and receiving data files, such as media files. The input/output port 38 may be a connection slot for receiving a subscriber identify module (SIM) card. The input/output port 40 may be a headphone jack that provides for connection of audio headphones. In other embodiments, the device 10 may include any number of input/output ports configured to connect to a variety of external devices, including but not limited to a power source, a printer, and a computer. In other embodiments, multiple ports may be included on a device. The ports may be any interface type such as a universal serial bus (USB) port, serial connection port, Firewire port, IEEE-1394 port, or AC/DC power connection port.

The electronic device 10 may also include various audio input and output elements. For example, input receivers 42 may include one or more microphones that receive user audio input such as a user's voice. Additionally, the electronic device may include one or more output transmitters 44. The output transmitters 44 may include one or more speakers for transmitting audio signals to a user. The input receivers 42 and the output transmitters 44 may operate together as audio elements of a telephone.

Figure 2:
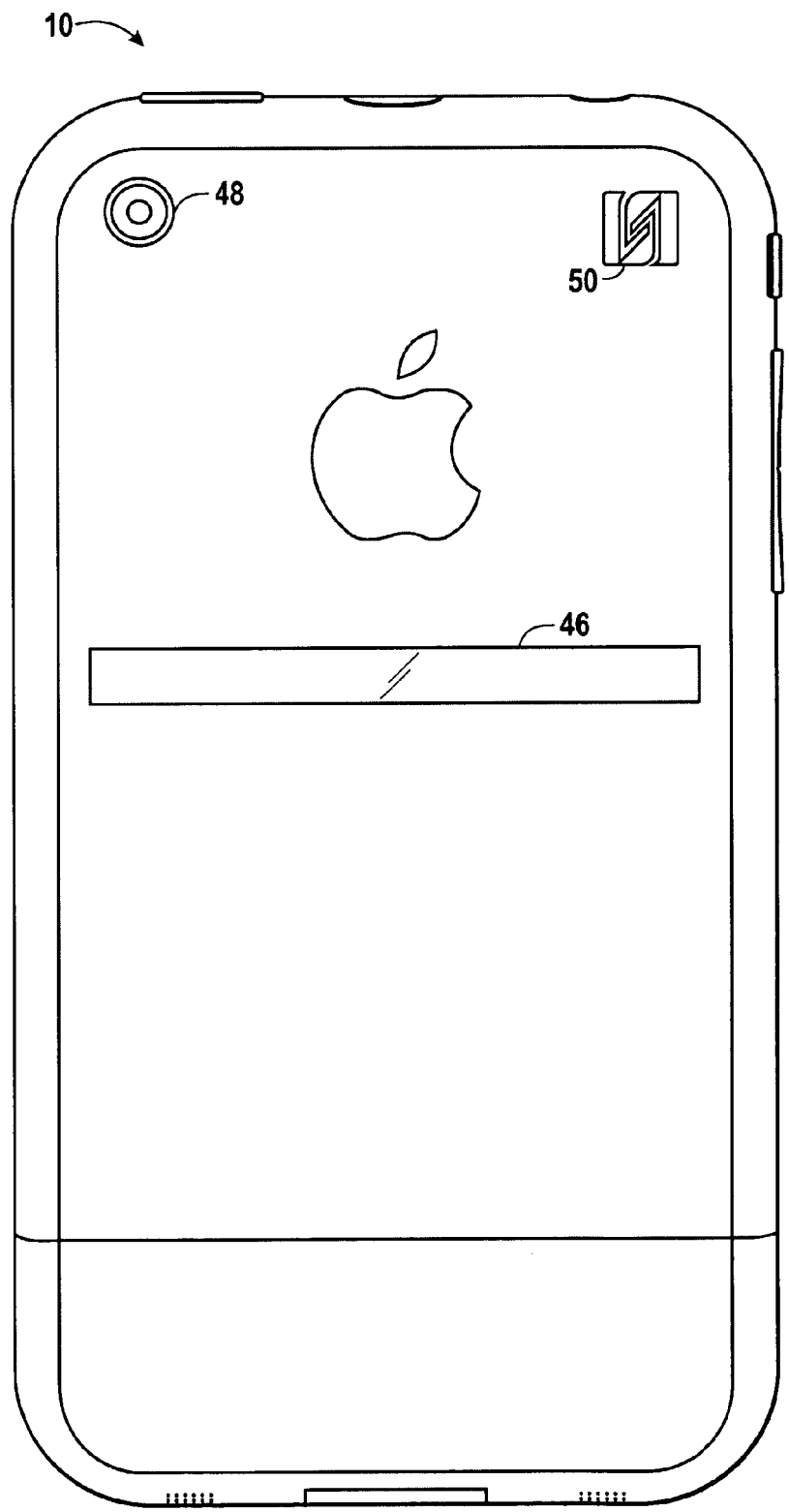
FIG. 2 is a back view of an electronic device in accordance with one embodiment.

Turning now to FIG. 2, a back view of the device 10 is illustrated. As seen from the back view, the device 10 may include a bar code scanner 46. The bar code scanner 46 may be used to obtain product identifying information, which may then be used by the shopping program(s) of the device 10, embodiments of which will be described below. One of ordinary skill in the art will recognize various devices and techniques for implementing the bar code scanner 46 within the device 10.

The device 10 may also include a camera 48. The camera 48 may be used to shoot pictures and/or video. Moreover, as with the bar-code scanner, the camera 48 may also be used to identify certain consumer products. For example, the camera 48 may be used to capture an image of a bar code, which may then be processed by the device 10 to extract the encoded product-identifying information. Techniques for processing a video image to extract coded information will also be known by those of ordinary skill in the art.

The device 10 may further include a near field communication (NFC) interface 50. The NFC interface 50 may be located within the casing 12 and a mark or symbol on the exterior of the casing 12 may identify its location within the casing 12. The NFC interface 50 may allow for close range communication at relatively low data rates (424 kb/s), and may comply with such standards as ISO 18092 or ISO 21481, or it may allow for close range communication at relatively high data rates (560 Mbps), and may comply with the TransferJet® protocol. The NFC interface 50 may have a range of approximately 2 to 4 cm, for example. The close range communication with the NFC interface 50 may take place via magnetic field induction, allowing the NFC interface 50 to communicate with other NFC devices such as radio frequency identification (RFID) tags, for example. In this way, the NFC interface 50 may be used to identify a consumer product that contains an NFC compatible device such as an RFID tag.

Figure 3:
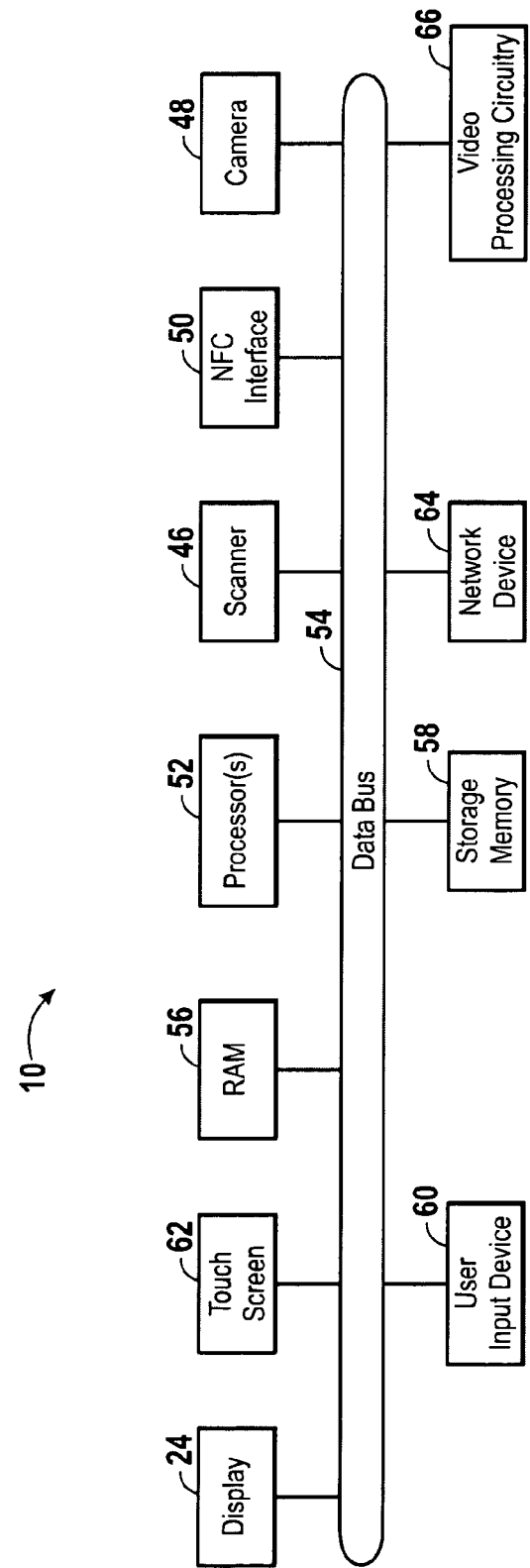
FIG. 3 is a simplified block diagram of the device in FIGS. 1 and 2 in accordance with one embodiment.

Turning now to FIG. 3, a block diagram of circuitry that may be used in the device 10 is provided. As stated above, the device 10 may include a scanner 46, a camera 48, and an NFC interface 50. The operation of the device 10 may be controlled by one or more processor(s) 52 that provide the processing capability required to execute the operating system, programs, graphical user interface 28, and any other functions of the device 10. The processor(s) 52 may include a single processor or a plurality of processors. For example, the processor(s) 52 may include "general purpose" microprocessors, a combination of general and special purpose microprocessors, instruction set processors, graphics processors, video processors, and/or related chips sets, and/or special purpose microprocessors. The processor(s) 52 also may include on-board memory for caching purposes.

The processor(s) 52 may be coupled to a data bus 54 and configured to transmit PIO instructions to the various devices coupled to the data bus 54 or to initiate DMA transfers. As such, the data bus 54 may facilitate both DMA transfers and direct read and write instructions from the processor(s) 52. In embodiments, the data bus 54 may be an Advanced Microcontroller Bus Architecture (AMBA) compliant data bus.

The electronic device 10 may also include a random access memory (RAM) 56 electrically coupled to data bus 54. The RAM 56 may include any type of RAM, such as dynamic RAM and/or synchronous double data rate RAM, for example, and may also include non-volatile memory devices, such as ROM, EPROM and EEPROM or some combination of volatile and non-volatile memory. Additionally, the RAM 56 may also include a memory controller that controls the flow of data to and from the RAM 56.

Information used by the processor(s) 52 may be located within storage memory 58. The storage memory 58 of electronic device 10 may be used for storing data required for the operation of the processor(s) 52 as well as other data required by the device 10. For example, the storage memory 58 may store the firmware for the electronic device 10 usable by the processor(s) 52, such as an operating system, other programs that enable various functions of the electronic device 10, GUI functions, and/or processor functions. The storage memory 58 also may store components for the GUI 28, such as graphical elements 30, screens, and templates. Additionally, the storage memory 58 may store data files such as media (e.g., music and video files), image data, software, preference information (e.g., media playback preferences), wireless connection information (e.g., information that may enable the device 10 to establish a wireless connection, such as a telephone connection), subscription information (e.g., information that maintains a record of podcasts, television shows or other media to which a user subscribes), telephone information (e.g., telephone numbers), and any other suitable data.

The storage memory 58 may be non-volatile memory such as read only memory, flash memory, a hard drive, or any other suitable optical, magnetic, or solid-state computer readable media, as well as a combination thereof.

A user may navigate through the GUI 28 (FIG. 1) using user input devices 60 coupled to input structures located at external surfaces of the device 10. The user input devices 60 may interface with the input structures 14, 16, 18, 20, and 22 shown in FIG. 1 and may communicate with the processor(s) 52 through an I/O controller (not shown.)

As noted above, a user may also control the device 10 by touching the graphical elements within the GUI 28. As such, a touch screen 62 may be positioned in front of or behind the display 24 and may be used to select graphical elements 30 shown on the display 24. The touch screen 62 is configured to receive input from a user's or object's touch and to send the information to the processor(s) 52, which interprets the touch event and performs a corresponding action. The touch screen 62 may employ any suitable type of touch screen technology such as resistive, capacitive, infrared, surface acoustic wave, electromagnetic, or near field imaging, and may be used in conjunction with or independently of the user input device 60 to select inputs for the device 10.

The device 10 may also include one or more network devices 64 for receiving and transmitting information over one or more broadband communications channels. As such, the network device 64 may include one or more network interface cards (NIC) or a network controller. In some embodiments, the network device 64 may include a local area network (LAN) interface for connecting to a wired Ethernet-based network and/or a wireless LAN, such as an IEEE 802.11x wireless network (i.e., WiFi). In certain embodiments, the NFC interface 44 may be used to receive information, such as the service set identifier (SSID), channel, and encryption key, used to connect to the LAN.

The network device 64 also may include a wide area network (WAN) interface that permits connection to the Internet via a cellular communications network, such as an Enhanced Data rates for GSM Evolution (EDGE) network, or a Universal Mobile Telecommunications System (UMTS) network. Further, the network device 64 may include a personal area network (PAN) interface for connecting to a PAN such as a Bluetooth® network, an IEEE 802.15.4 (ZigBee) network, or an ultra wideband (UWB) network. The network device 64 may interact with an antenna to transmit and receive radio frequency signals of the network. The network device 64 may include any number and combination of network interfaces. Among other things, the network device 64 may allow the device 10 to send and receive a broad range of shopping related information, as will be described below.

The device 10 may also include video processing circuitry 66 coupled to the data bus 54. The video processing circuitry 66 may be configured to process video data, such as images received from camera 48, and send the processed video data to other parts of the system. For example, the video processing circuitry 66 may be configured to compress video data obtained from camera 48 into a JPEG or MPEG format and send the compressed video data to RAM 56 or storage memory 58. For another example, the video processing circuitry 66 may be configured to send uncompressed or decompressed video data to the RAM 56 or the display 24. For yet another example, the video processing circuitry may be used to extract textual or encoded information from an image, such as numbers, letters, and/or bar code information.

The device 10 may also include a positioning device 70 used to determine a user's geographical position on a map, such as a street map or building map. The positioning device may utilize the global positioning system (GPS) or a regional or site-wide positioning system that uses cell tower positioning technology or WiFi technology, for example.

Figure 4:
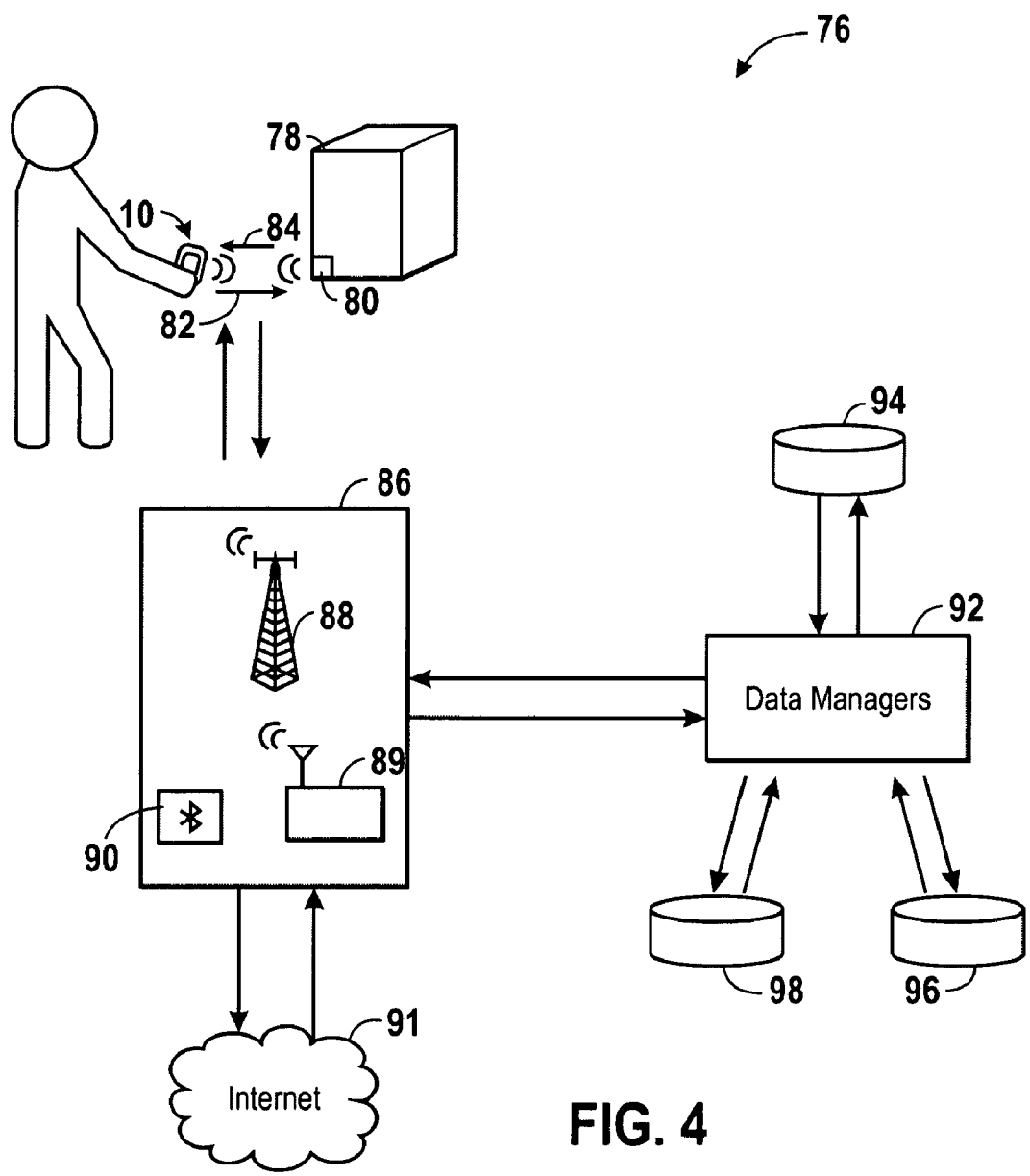
FIG. 4 is a diagrammatical representation of a data transfer system in accordance with one embodiment.

FIG. 4 illustrates a data transfer system in accordance with certain embodiments. The data transfer system 76 allows a user of the electronic device 10 to acquire shopping related information related to a product 78. In some embodiments, the product 78 may be NFC enabled so that the electronic device 10 may acquire information about product 78 through NFC communications. As such, the product 78 may include an NFC device 80 such as an RFID tag, which may be passive or active and may be included in the product packaging or the product itself. The NFC device 80 may contain information that may be used to identify the product 78. The information, herein referred to as a "product identifier," may be any information that can be used to identify a product, such as a UPC code, model number, serial number, a product name, product description, etc. In other embodiments, which will be described below, a product may be identified via barcode scanner, camera, or by entering a product identifier manually.

To begin NFC communications the NFC interface 50 may send an output signal 82 to the NFC device 80. The output signal 82 powers the NFC device 80 and triggers the NFC device 80 to transmit a return signal 84, which is received by the NFC interface 50. The return signal 84 carries the product identifier and may also carry other relevant information, such as a product description or a media file, depending on the capacity of the NFC device 80.

In some embodiments, the return signal 84 may transmit only a limited amount of information to electronic device 10. Therefore, in order to obtain more extensive information about the product 78, the electronic device 10 may communicate over a broadband communication system 86. The broadband communication system 86 may include a cellular communications network 88, local area network 89, or personal area network 90, as described above.

Through the broadband communications system 86, the electronic device 10 may be coupled to the Internet 91. Through the Internet 91, the electronic device 10 may be directed to a website related to a particular product such as a retailer's website or a consumer information website.

Moreover, through the broadband communication system 86 the electronic device 10 may communicate with the data manager 92. For example, to obtain shopping related information, the electronic device 10 may send an information request packet to the data manger 92. The substance of the information request packet may vary depending on the information being sought. As will be explained further below, the information request packet may include one or more product identifiers, a request ID which informs the data manager 92 regarding the type of information sought by electronic device 10, the geographical location of the electronic device 10, a user ID, personal preference information, etc. In response to the information request packet, the data manager 92 may compile the information sought into one or more data packets to be sent back to the electronic device 10.

To assemble the information for the data packet(s), the data manager 92 may be communicatively coupled to one or more databases. For example, the data manager 92 may be coupled to a manufacturer database 94. The manufacturer database 94 may hold manufacturer related information for a wide variety of products. For example, the manufacturer database 94 may hold information such as brand name, model number, serial number, UPC code, product types or classifications, product descriptions, suggested retail prices, stores where the product may be available, a media file regarding the product, a web page address for obtaining more information about the product or purchasing the product, among other things. To obtain the appropriate manufacturer related data for the product 78, the data manager 92 may cross reference the product identifier with data in the manufacturer database 94. To be included in the manufacturer database, a manufacturer may pay a fee to the manufacturer of the device 10, for example, to upload the relevant product information related to the manufacturer database 94.

The data manager 92 may also be coupled to a retailer database 96 which may hold retailer specific product information. As with the manufacturer database, the retailer database 96 may hold information that pertains to the product itself. Moreover, the retailer database 96 may hold retailer specific product information such as the name of the retailer, store locations, the actual retail price of a product, a retailer webpage address, a retailer telephone number(s), etc. Additionally, some database entries may be flagged to indicate some feature of the entry, such as whether the data applies to in-store or Internet purchases and whether a special promotion exists in relation to the product, etc. The data manager 92 may obtain appropriate retailer-related data for the product 78 by cross-referencing the product identifier with data in the retailer database 94. In some embodiments, a retailer may pay a fee to the manufacturer of the device 10, for example, to be included in the retailer database 94.

In some embodiments, both the manufacturer database 94 and the retailer database 96 may contain advertisements that may be sent to the electronic device 10 in response to the information request packet. Such advertisements may include product related data, and/or media files such as picture, video, and audio files.

The data manager 92 may also be communicatively coupled to a consumer database 98 which may hold information related to the user of the electronic device 10. For example, the consumer database 98 may include a preference profile of the user of the electronic device 10. The preference profile may include such information as specific retailers that the user prefers and/or specific brands of products that the user prefers. The consumer database 98 may be populated based on information exchanges between the data manger 92 and the electronic device 10 which may indicate the shopping habits of the user. Additionally, the consumer database 98 may also be populated by personal preferences identified by the user, an embodiment of which is described in relation to FIG. 5. In other embodiments, the information contained in the consumer database 98 may also included in the memory of the electronic device 10 itself.

In some embodiments, the data manager 92 and the databases 94, 96, and 98 may be a part of a system owned and operated by a single entity, such as a manufacturer of the handheld electronic device 10. In this embodiment, the operator may populate the manufacturer database 94 and the retailer database 96 with information provided to the operator by various product manufacturers and retailers in exchange for a fee.

The content of the data packets compiled by data manager 92 may depend on the information provided by the electronic device 10 in the information request packet. For example, if the user is requesting information regarding a product per se, such as specifications, suggested retail price, warrantee information, etc., the information request packet may include a single product identifier and request ID that indicates a request for manufacturer-specific product information. In response, the data packet may include information from the manufacturer database 94 for the one product identified.

For another example, if the user requests retail pricing information for a particular product, the electronic device 10 may send a product identifier, a geographical location of the electronic device 10, retailer preferences, and/or a request ID indicating a request for pricing information for various retailers. In response, the data packet may include retail prices for one or more preferred retailers within a specified travel distance from the electronic device 10.

Examples of data exchanges between the electronic device 10 and the data manager 92 will be further described in relation to the shopping features of the electronic device 10, as illustrated in FIGS. 5-20. It will be appreciated that the information exchanged between the electronic device 10 and the data manager 92 will depend on the way that processing tasks are divided between the electronic device 10 and the data manager 92. For example, if the retailer preferences are stored in the consumer database 98, the electronic device 10 may send a user ID that allows the data manager to retrieve the proper retailer preferences. However, if the retailer preferences are stored on the electronic device 10, the electronic device 10 may send all of the retailer preference data to the data manager 92 instead of or in addition to the user ID. It is intended that embodiments are not limited to a particular division of processing tasks between the electronic device 10 and the data manager 92.

Furthermore, in some embodiments, the data retrieved by the data manager 92 may be used to derive secondary information that may be useful to a user. For example, product pricing data may be used to calculate a total price for several products. For another example, retailer locations may be used to calculate distances between the user and the retailer. For yet another example, the product pricing data may be used to generate priority or relevance information, which may effect how the data is presented to a user. It is important to note that the secondary information, which will be described further below, may be derived by the data manager 92 and included in the data packet or may be derived by electronic device 10. Therefore, it will be appreciated that although certain information may be described below as being calculated by either the electronic device 10 or the data manager 92, the present embodiments are not intended to be limited by whether a particular calculation is performed by the electronic device 10 or the data manager 92.

FIGS. 5-20 further detail the capabilities of the electronic device 10 and the data transfer system 76 by illustrating various screens that the user of the electronic device 10 may encounter while using the various shopping related features of the electronic device 10. The functionality described may be achieved with a wide variety graphical elements and visual schemes. Therefore, the present embodiments are not intended to be limited to the precise user interface conventions adopted herein. Rather, embodiments may include a wide variety of user interface styles. Indeed, the presently disclosed user interface conventions are based on Apple's iPhone for the convenience of the reader, although other user interface conventions could readily be used to carry out the present techniques.

Figure 5:
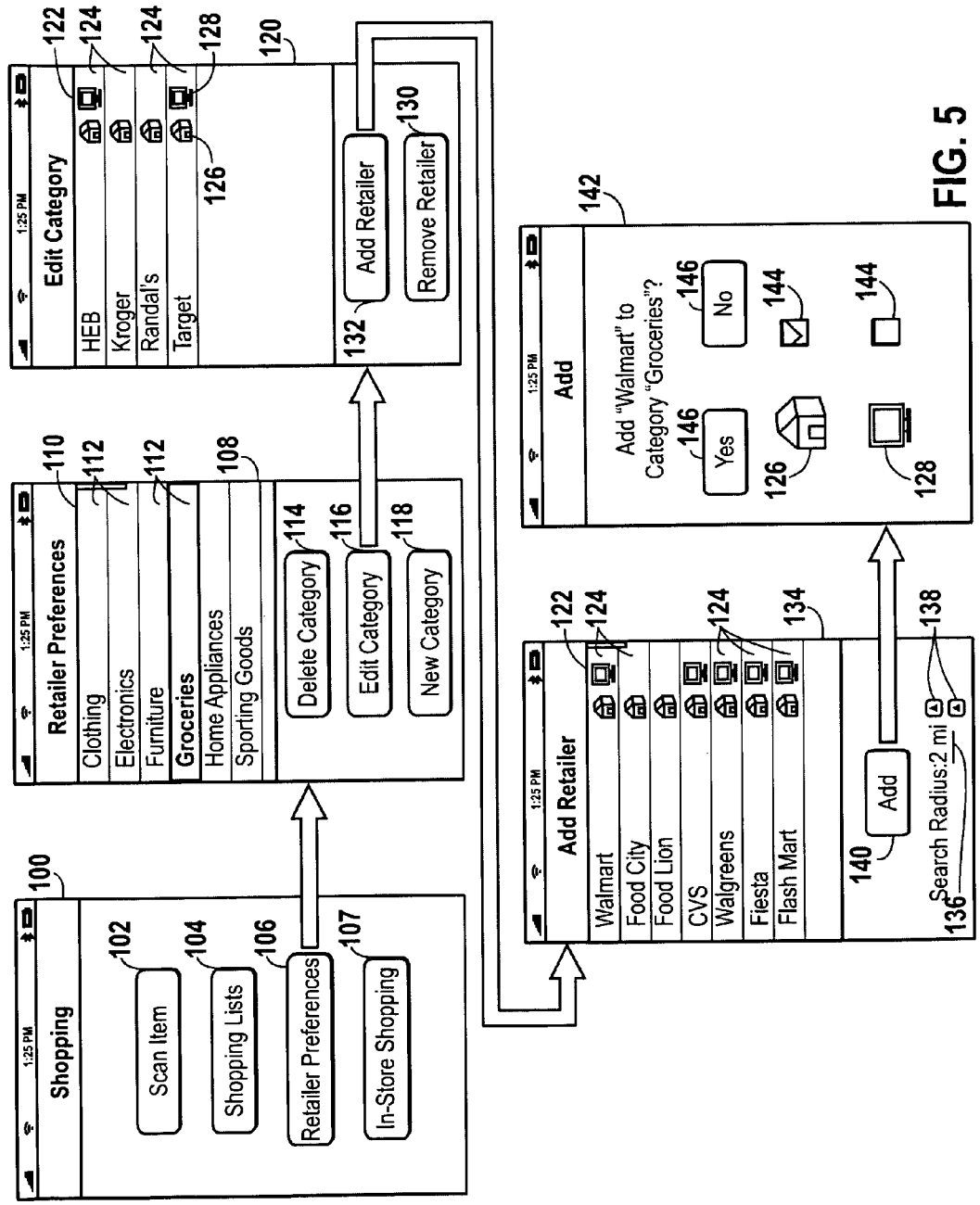
FIG. 5 is a front view of the device in FIG. 1, illustrating a method of generating retailer preference lists in accordance with one embodiment.
Figure 6:
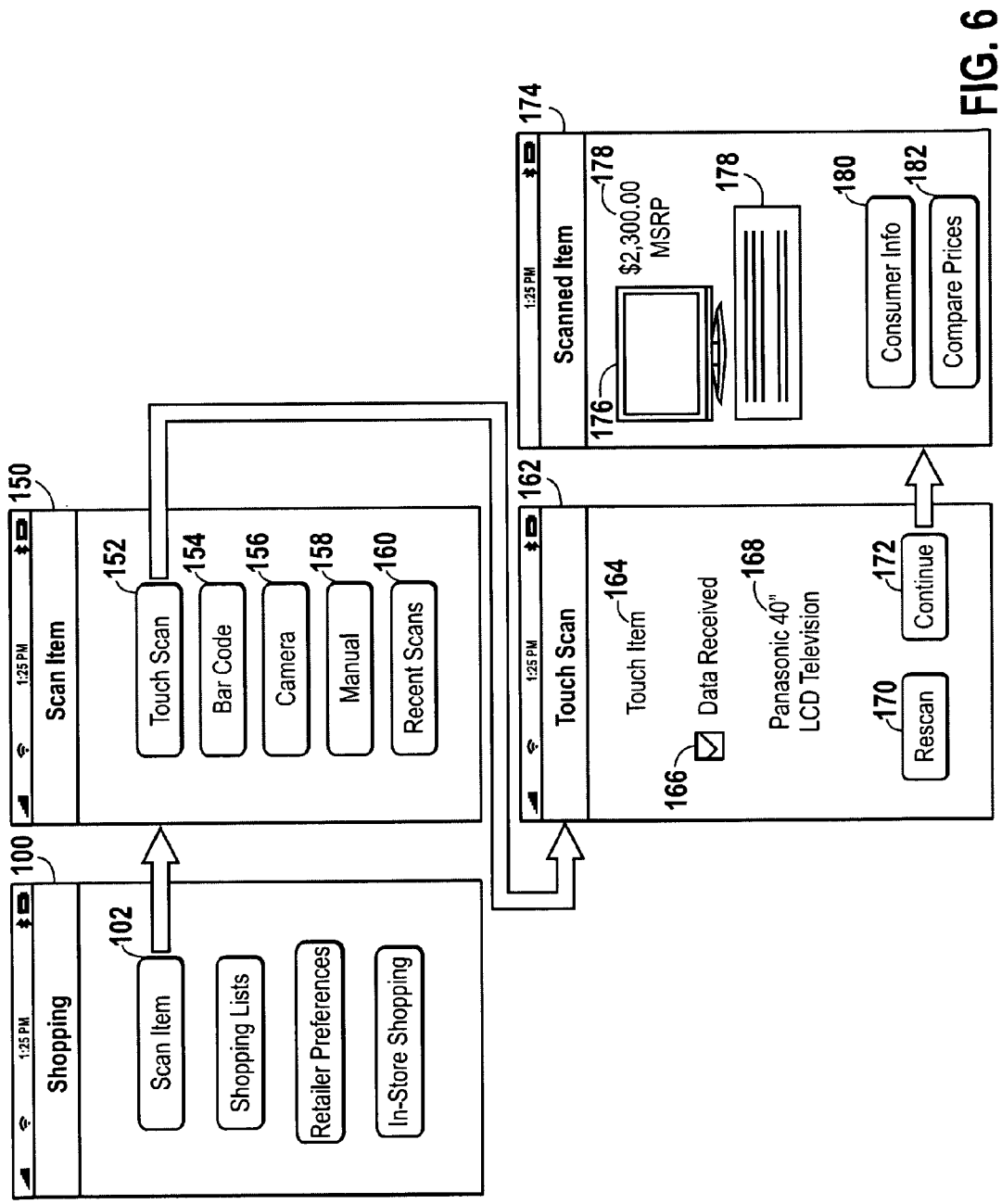
FIGS. 6-10 are front views of the device in FIG. 1, illustrating methods of identifying a consumer product in accordance with embodiments.

FIG. 5 illustrates a method of using the electronic device 10 to specify one or more preferred retailers. In some embodiments, selection of the shopping icon 34 (FIG. 1) may advance the user to a shopping screen 100, which may serve as a gateway to the shopping features of the electronic device 10. The shopping screen 100 may include several graphical elements such as buttons 102, 104 and 106 and 107, all of which allow the user to access the shopping feature indicated. As will be explained further below, embodiments allow the user to compare product prices between various retailers. To narrow the search, the user may be prompted to specify a particular retailer or group of retailers that the user prefers. To provide the user a quick way to specify one or more retailers when prompted, the electronic device 10 may allow the user to create and save one or more lists of preferred retailers ahead of time. To access this feature the user may select the retailer preferences button 106 from the shopping screen 100.

Upon selection of the retailer preferences button 106, the user may be advanced to a retailer preferences screen 108. The retailer preferences screen 108 may include a retailer category list 110 that includes several retailer categories 112 pertaining to any type of retail product, such as groceries, sporting goods, clothing, electronics, home appliances, furniture, office supplies, automobiles, etc. As shown in the edit category screen 120, the retailer categories 112 may include a list of retailers that carry items within that particular category. In some embodiments, one or more of the retailer categories 112 may be preloaded by a manufacturer of the electronic device 10, and one or more categories may be custom created by the user. Categories may be deleted by selecting an individual category within the retailer category list 110 and touching the delete category button 114. New categories may be created by selecting the new category button 118. Categories may be edited and customized by selecting the retailer category 112 in the retailer category list 110 and pressing the "edit category" button 116.

The "edit category" screen 120 includes a retailer list 122 which includes several retailer listings 124. In addition to the name of the retailer, each retailer listing 124 also includes one or more icons. For example, a retailer listing 124 may include a building icon 126 that indicates that the retailer listing pertains to a physical store location. The retailer listing 124 may also include an on-line icon 128 that indicates that the retailer listing 124 pertains to on-line shopping. The presence of a building icon 126 or an on-line icon 128 may indicate the preference of the user regarding whether they wish to purchase items from that particular retailer on-line or at the store. The retailer listings 124 included within a retailer category 110 may be preloaded by the manufacturer of the electronic device 10, possibly in exchange for a fee from the retailers, and may also be edited by the user to include only those retailers that the user frequents.

The user may remove a retailer by selecting a retailer listing 128 in the retailer list 122 and selecting the remove retailer button 130. To add a retailer the user may by select the "add retailer" button 132, which may advance the user to the add retailer screen 134 and may also cause the electronic device 10 to send an information request to the data manger 92, requesting a list of retailers from the retailer database 96.

The add retailer screen 134 may include a retailer list 122, which may include all the retailers contained within the retailer database 96 or may be narrowed to provide a more focused set of relevant retailers. For example, the retailer list 122 may narrowed to include only those stores within a specified radius, geographic region, zip code, etc. For example, the radius may be relative to the geographical location of the electronic device 10 or a geographical location specified by the user. Accordingly, the add retailer screen 134 may include a search radius indicator 136 by which the user may specify the search radius used to acquire the retailer list 122. The add retailer screen 134 may also include buttons 138 for increasing or decreasing the search radius.

As in the edit category screen 120, the add retailer screen 134 may also include the building icon 126 and the on-line icon 128. However, in the add retailer screen 134, the building icon 126 and the on-line icon 128 indicate whether the retailer exists as a physical store and/or whether it has an on-line shopping presence. To add one of the retailers from the retailer list 122 to the retailer category 112, the user may select the retailer in the list and press the add button 140, which advances the user to the add screen 142, which includes a message to the user requesting confirmation that the user would like to add the selected retailer to the retailer list. The add screen 142 may also include check boxes 144 which are adjacent to and correspond with the building icon 126 and the on-line icon 128. The user may select or de-select the check boxes 144 to indicate whether the user wishes to add the retailer as a "brick-n-mortar" retailer and/or an on-line retailer.

Selection of one of the confirmation buttons 146 may add the retailer selected to the retailer category 112 and return the user back to the edit category screen 120 or the add retailer screen 134. The significance of the retailer preferences will be better understood with reference to the price comparison features of the electronic device 10 described further below in relation to FIGS. 11 and 18-20.

Turning first to FIGS. 6-10 various techniques for using the electronic device 10 to identify a product are illustrated. In some embodiments, the GUI of the device 10 may include a scan item screen 150, which a user may access from the shopping screen 100 by selecting the scan item button 102. From the scan item screen 150, the user may select a method of identifying a product. As described above, the user may identify a product using the NFC interface 50, the bar code scanner 46, camera 48. Additionally, the user may enter a product identifier manually or may select a previously scanned item from a list of recent scans. It is noted that a product identified manually may nevertheless be referred to as a scanned item.

By selecting touch scan button 152, the user may advance to the touch scan screen 162, which allows the user to read a product identifier from the NFC device 78 as described above. To reserve battery life, the NFC interface 50 may be powered down when not in use. Therefore, selection of the touch scan button 152 may cause the NFC interface 50 to be turned on. The touch scan screen 162 may include a user instruction message 164 informing the user that the NFC interface 50 has been turned on and is ready to communicate with the NFC device 80. The touch scan screen 162 may also include a success indicator 166. The success indicator 166 may indicate to the user that a successful read of the NFC device 80 has occurred and that the product identifier has been obtained. The touch scan screen 162 may also include a product description element 168, which may contain a brief description of the information received by the NFC scan and may serve as an indication to the user that the scan was successful at acquiring the correct product information.

After the success indicator 166 informs the user that a successful scan has occurred, the user may evaluate the product description element 168 and may decide to re-scan the product by selecting the re-scan button 170 if the user believes that the scan did not acquire the correct information. If the user is satisfied with the scan, the user may continue to the next screen by selecting the continue button 172.

If the user continues to the next screen, the electronic device 10 may then acquire more extensive product information by sending an information request packet to the data manager 92, as described above in relation to FIG. 4. In response to the information request packet, the data manager 92 may access the manufacturer's database 94 and cross-reference the product identifier with the information in the manufacturer database 94 to acquire the appropriate product information. The data manager 92 may then send a data packet to the electronic device 10 containing the product information. After receiving the data packet, the electronic device 10 may also advance to the scanned item screen 174 where more extensive product information may be displayed.

The product information displayed in the scanned item screen 174 may include any product information that may be provided by a manufacturer, such as product specifications, suggested retail price, a product picture, retailer's where the product may be available, special promotions such as manufacturer rebates, for example. Accordingly, the scanned item screen 174 may include a product picture element 176 and one or more product information elements 178. The scanned item screen 174 may also include one or more buttons 180 and 182 which allow the user to access additional shopping features of the electronic device 10, which will be explained further below.

Figure 7:
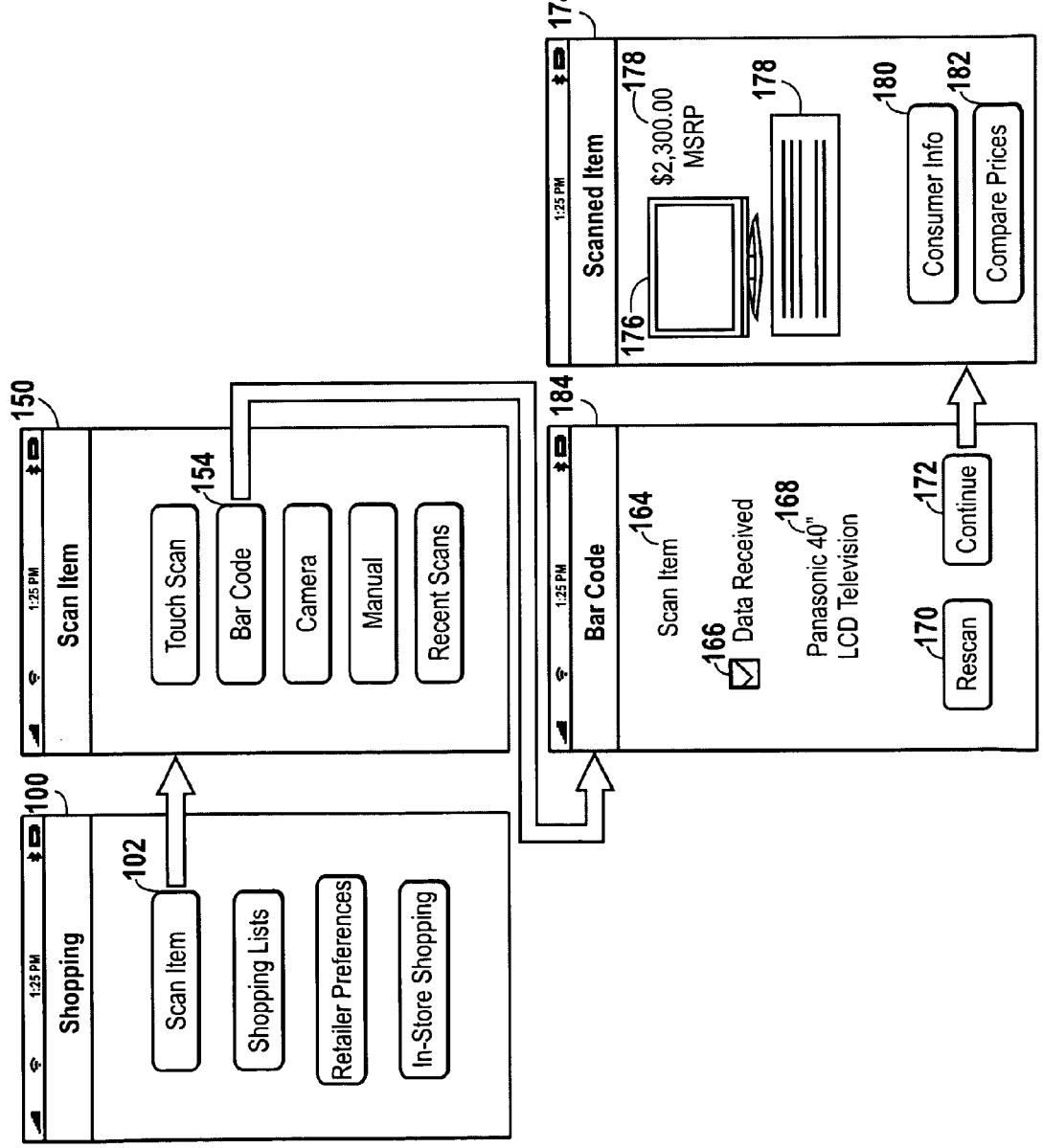

Turning to FIG. 7 and returning to the scan item screen 150, a method of using the bar code scanner 46 to identify a product is shown. From the scan item screen 150, the user may select a bar code button 154 to advance to a bar code screen 184. The bar code screen 184 may include a user instruction message 164 indicating to the user that the bar code scanner 46 is enabled and ready to scan. As with the touch scan screen 162, the bar code screen 184 also includes a success indicator 166 and a product description element 168 which may provide feedback to the user regarding the success of the bar code scan. By selecting the continue button 172 the user may advance to the scanned item screen 174, as described above.

Figure 8:
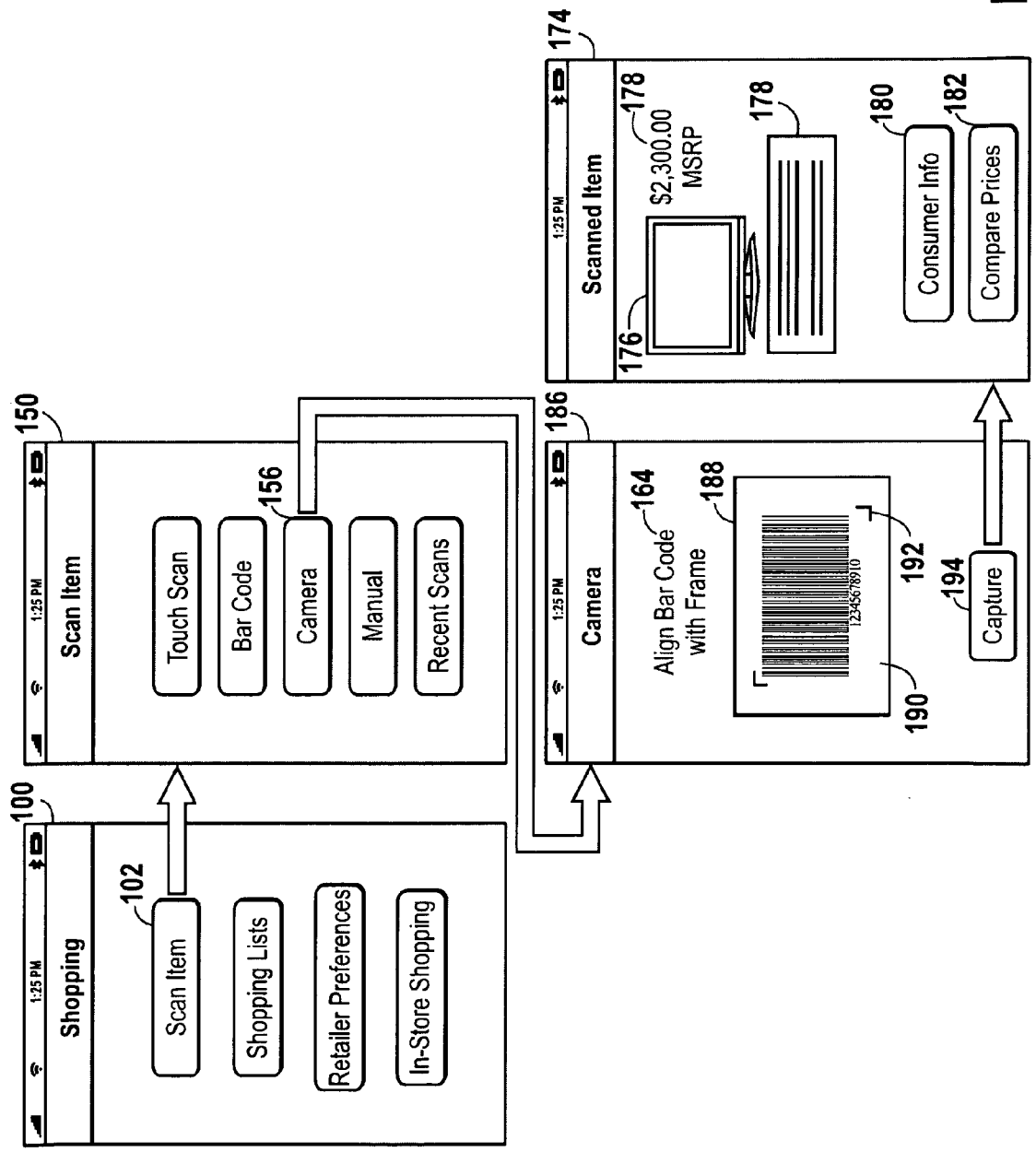

Turning to FIG. 8 and returning to the scan item screen 150, a method of using the camera 48 to identify a product is shown. From the scan item screen 150, the user may select the camera button 156 to advance to the camera screen 186. The camera screen 186 may allow a user to take a picture of a bar code located on the product packaging or the product itself. This information may then be processed by the electronic device 10 to identify the product, in accordance with known digital image processing techniques. To capture a desired image, the camera screen 186 may include a camera view window 188 with alignment brackets 192 for aligning the desired image, such as a bar code 190, within an operative portion of the camera view window. The camera screen 186 may also include a user instruction message 164 instructing the user to align the bar code 190 with the alignment brackets 192. After aligning the bar code 190 with the alignment brackets 192, the user may then select the capture button 194 to advance to the scanned item screen 174.

Figure 9:
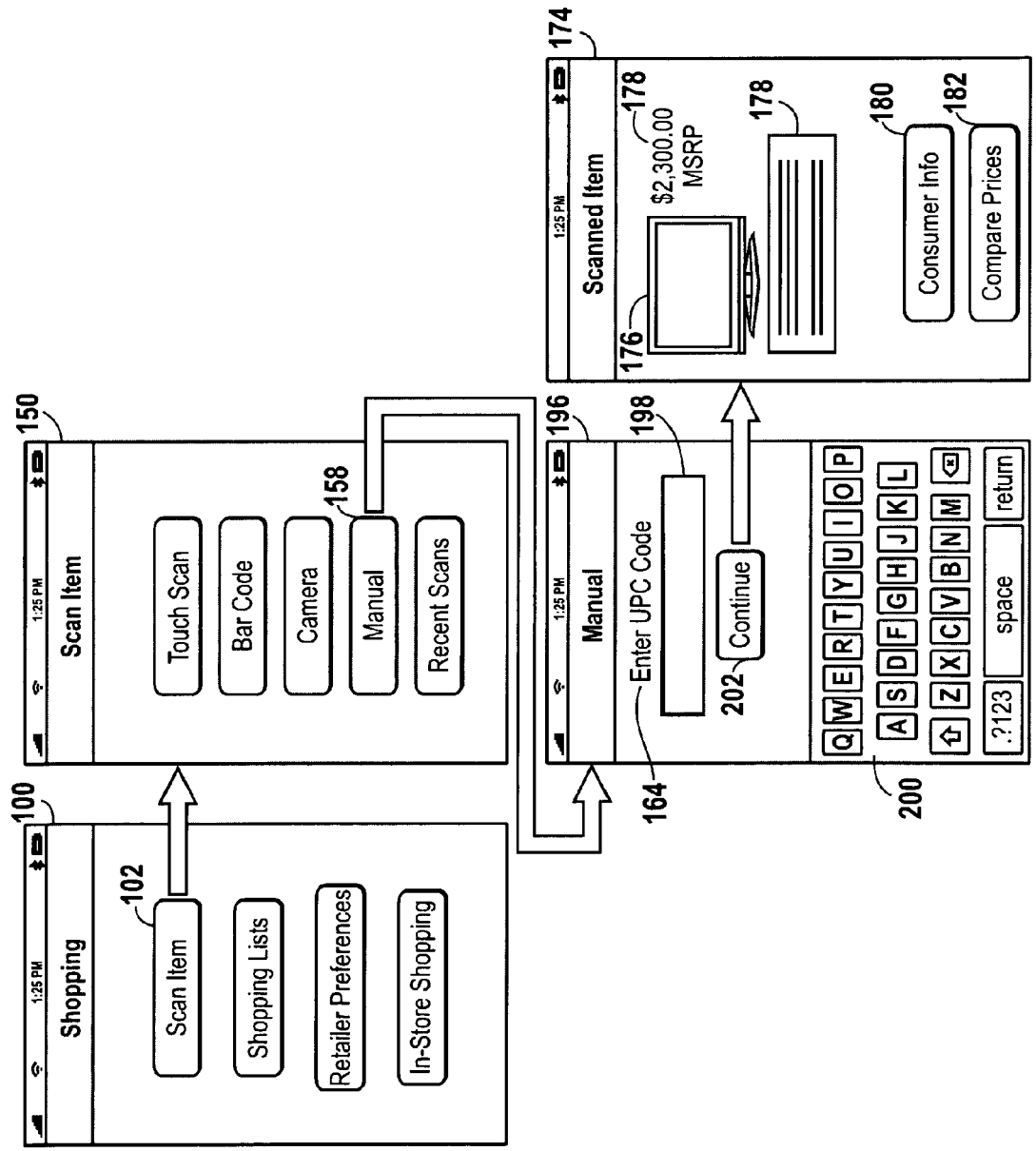

Turning to FIG. 9 and returning to the scan item screen 150, a method for allowing a user to manually enter an product identifier is shown. From the scan item screen 150, the user may select the manual button 158 to advance the manual screen 196. Manual screen 196 may include a text entry box 198 and a keyboard interface 200 for typing in the product identifier. The user instruction message 164 may instruct the user to enter the appropriate product information. In some embodiments, the user may be asked to enter a UPC code. After entering the product identifier in the text entry box 198, the user may continue to the scanned item screen 174 by selecting the continue button 202.

Figure 10:
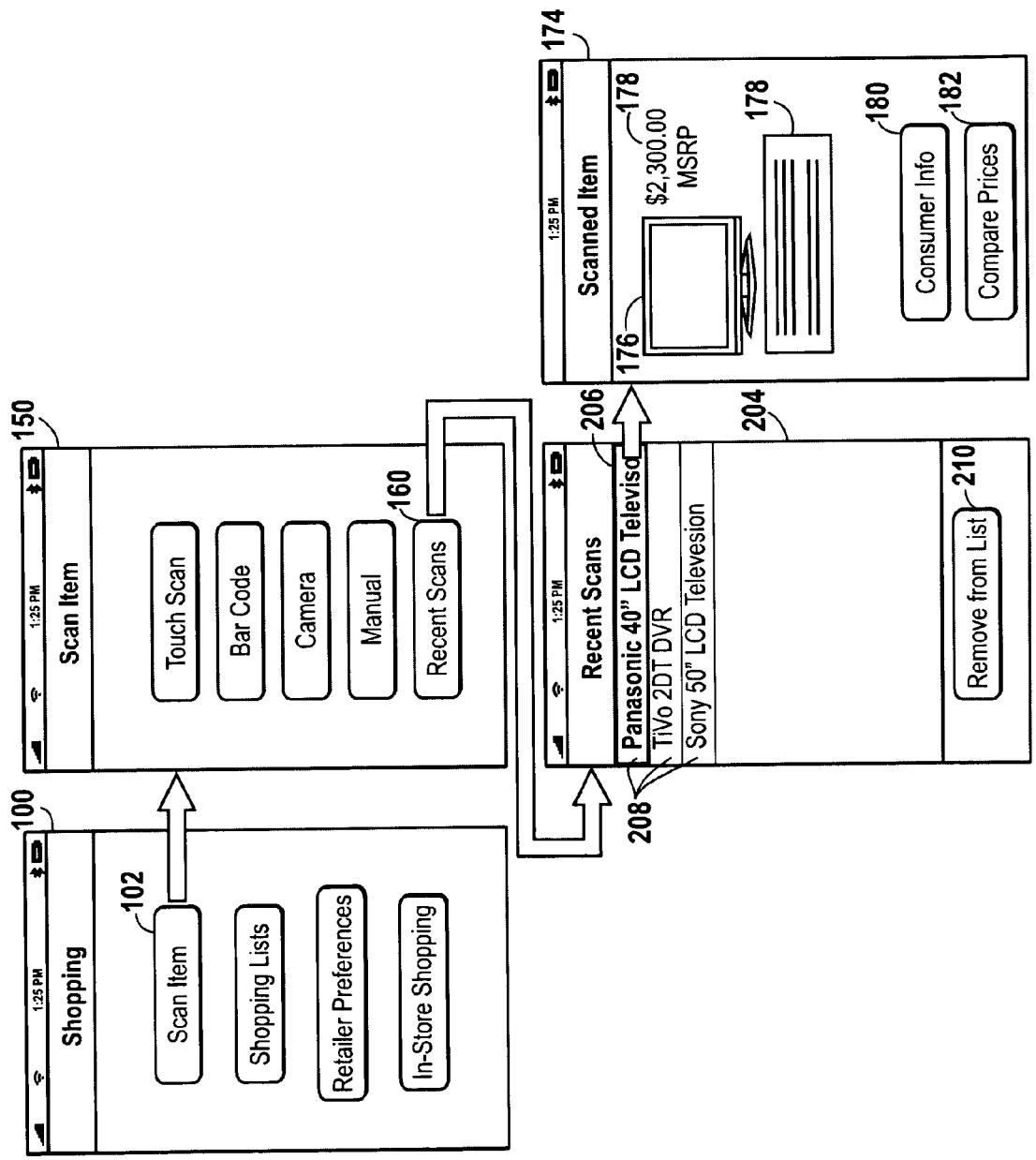

Turning to FIG. 10 and returning to the scan item screen 150, a method of allowing the user to access recently scanned items is shown. From the scan item screen 150, the user may select the recent scans button 160 to advance to a recent scans screen 204. The recent scans screen 204 may include a recent scan list 206 with a list of recent scan entries 208. The recent scan entries 208 may be loaded into the storage memory 58 of the electronic device 10 each time that the user scans an item. In this way, the user will have a running history of all scanned items and may return to them at any time. The user may remove items from the list by selecting the "remove from list" button 210. By selecting a recent scan entry 208, the user may then advance to the scanned item screen 174.

Figure 11:
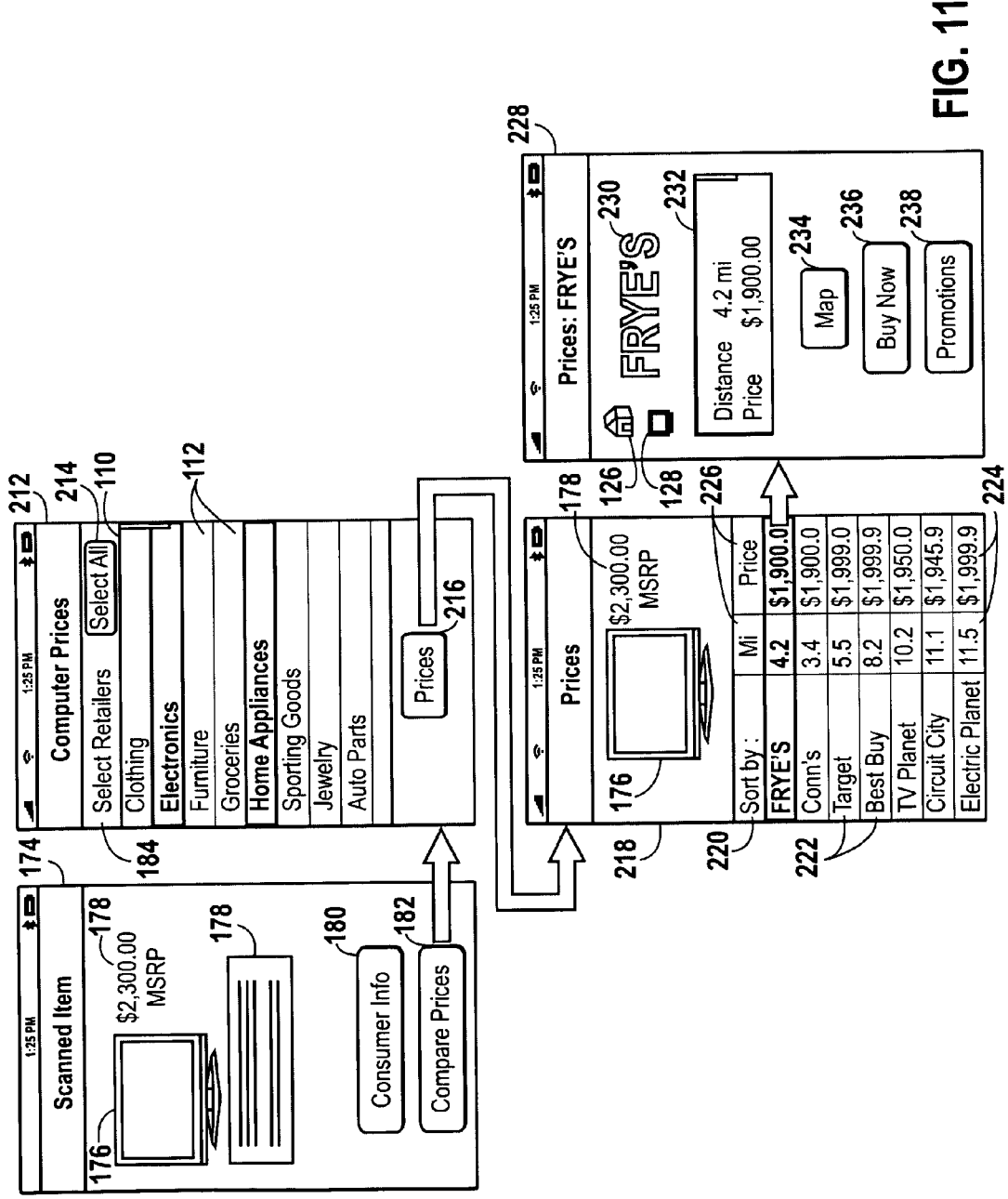
FIG. 11 is a front view of the device in FIG. 1, illustrating a method of comparing retailer's prices for a single product in accordance with one embodiment.

As mentioned above, once a product identifier has been obtained, the electronic device 10 may be used to obtain product information that may help a user to make the best possible purchase. Turning to FIG. 11, and the scanned item screen 174, a method of using the electronic device 10 to compare product prices for several retailers is depicted in accordance with an embodiment. From the scanned item screen 174, the user may select the "compare prices" button 182 to advance to the consumer prices screen 212. The consumer prices screen 212 may include a user instruction message 164 requesting the user to select one or more retailer categories 112. As discussed above in relation to FIG. 5, each of the retailer categories 112 corresponds with a list of retailers that have been pre-selected by the user or pre-set at the factory. In selecting one or more retailer categories, the user selects the retailers that will be included in the price comparison.

After the user has selected one or more of the retailer categories 112, the user may advance to the prices screen 218 by selecting the "prices" button 216, at which time, the electronic device 10 may send an information request packet to the data manager 92, as discussed above. The information request packet may include the product identifier, a user identifier, the geographical location of the user, and/or the list of retailers corresponding with the selected retailer categories 112. The data manager 92 may then compile one or more data packets to send back to the electronic device 10 by cross-referencing the product identifier with the information in the retailer database 96. In some embodiments, the data manager may also cross-reference the user identification with the consumer database 98 to obtain preferences of the user.

The data packets compiled by the data manager 92 may include a list of retailers that sell the scanned item, along with one or more retailer information packets associated with each retailer. The retailer information packets may include such information as the store location, the price of the item at that retailer, the address of the retailer, a picture or icon or a segment of video pertaining to the retailer, an audio file pertaining to the retailer, a phone number of the retailer, an indication of whether the data applies to in-store purchases or on-line purchases, an indication of whether a special promotion may exist with regard to the item or similar items, and any other information that may be useful to the user.

If a large number of relevant retailers are found by the data manager 92, the data manager 92 may select a limited number of retailers to include in the data packets, depending on the likelihood of user interest in a particular retailer. The user may, therefore, specify a maximum number of hits that the user wishes to receive. The likelihood of user interest may be determined by the data manager 92 by using various criteria, such as retailer prices, location of the retailer, and/or user preferences. For example, the data manager 92 may select a number of retailers with the lowest prices available for the selected item. For another example, the data manager 92 may select a number of retailers which are closest to the geographical location of the user. For yet another example, the data manager 92 may select retailers for which the consumer has previously requested information, according to records stored in the consumer database 98. In one embodiment, the user may select or pre-select the manner in which retailers are displayed to the user.

Additionally, depending on the request ID sent by the electronic device 10, the data packets may include only a select portion of the retailer information available in the retailer database 96. For example, the data packets may include only the information that will be displayed in the prices screen 218, such as retailer name, retailer price and store location.

After the device 10 receives the data packet(s) from the data manager 92, the device 10 may advance the user to the prices screen 218. As in the scanned item screen 174, the prices screen 218 may include a product picture 176 and product information elements 178. The prices screen 218 may also include a retailer prices list 220 with one or more retailer price entries 222. Each of the retailer price entries 222 may include the name of the retailer as well as one or more retailer information elements 224. For example, retailer information elements 224 may include an indication of the distance between the current location of the user to the location of the retailer, and/or the distance from the retailer to a home location specified by the user. The retailer information element 224 may also include the retail price offered by the retailer for the scanned item 78. The prices screen 218 may also include one or more "sort" buttons 226 which may allow the user to alter the appearance of the retailer prices list 220. For example, the user may use the sort buttons 226 to sort the retailer prices list according to the retailer's distance or according to price.

By selecting a retailer price entry 222, the user may advance to the retail information screen 228. As discussed above, in some embodiments, the electronic device 10 may send another information request to the data manager 92 to obtain more detailed information pertaining to the selected retailer. In other embodiments, the more detailed information may have already been obtained during the previous information request. The retailer information screen 228 may include a building icon 126 and/or an on-line icon 128 indicating, as stated above, whether the particular retailer selected is a brick-and-mortar retailer and/or whether the retailer provides on-line shopping capabilities. The retailer information screen 228 may also include a retailer picture 230, which may be downloaded from the retailer database system 96. The retailer database screen 228 may also include a segment of video pertaining to the particular retailer. The retailer information screen 228 may also include a retail information window 232, which may hold a variety of information of interest to the user, such as the distance between the retailer and the user and/or the price offered by the retailer for the scanned item 78.

Figure 12:
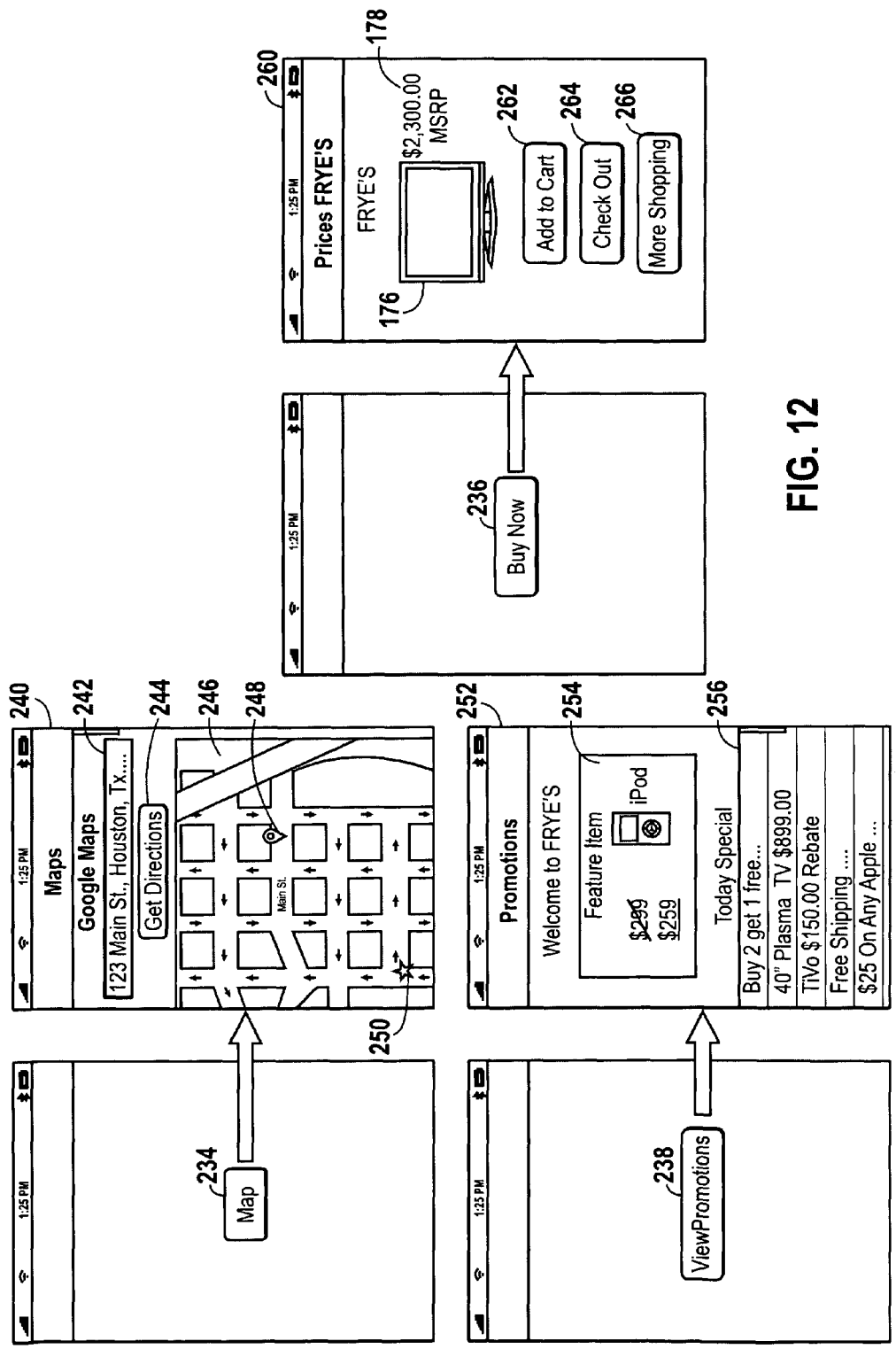
FIG. 12 is a front view of the device in FIG. 1, illustrating various features of the device in accordance with embodiments.

The retailer information screen 228 may also provide additional shopping-related features, as illustrated in FIG. 12. For example, by selecting a "map" button 234, the user may advance to a map screen 240. The map screen 240 may be created by a mapping application included in the electronic device 10 or may be an on-line mapping website running in the web browser of the electronic device 10. The mapping screen 240 may include an address indication element 242 as well as a "get directions" button 244, which allows the user to obtain turn-by-turn directions from his or her current location to the selected retailer. Moreover, the map screen 240 may also include a map element 246, showing a retailer location with a destination icon 248 and showing the current location of the user with a current location icon 250. In some embodiments, the map element 246 may also include a trace depicting a route between the user's current location and the selected retailer. Additional features of a mapping application may also be included, such as route guidance.

As another example of a feature available at the retailer information screen 228, the user may also select a "promotions" button 236 to advance to the promotions screen 252. The promotions screen 252 may serve as a medium by which the selected retailer may inform the consumer about special deals that the retailer is featuring. The promotions screen 252 may be a part of the shopping application of the electronic device 10, in which case, the promotional information may be stored in the retailer database 96 and sent to the device 10 by the data manager 92. Alternatively, selection of the "promotions" button 236 may direct the user to an on-line webpage of the retailer through a web application of the electronic device 10, in which case, the web address may be stored in the retailer database. The promotions screen 252 may include an advertisement window 254 which may display any type of media, including still pictures or video. The promotions screen 252 may also include a promotions list 256 with listings of special deals available from the retailer. Entries within the promotions list 256 may be product entries within the retailer database 96 that have been flagged as special promotions. In some embodiments, an audio and/or video file uploaded from the retailer database 96 may be played in conjunction with the promotions screen 252 or in conjunction with a selection of the user within the promotion screen 252.

The promotions screen 252 may also provide the option of retrieving an "electronic coupon" to be used at a particular retailer location or online. For example, the promotions list 256 may include a listing for a coupon, which the user may select to download the coupon to the electronic device 10. Upon purchasing the featured item, the user may upload the coupon from the electronic device 10 to the retailer to realize the savings advertised. If the user uses the coupon in the store, the retailer may have a corresponding electronic device at the cash register for communicating with the electronic device 10, such as through NFC communications, for example, so that the coupon may be transferred from the electronic device 10 to the retailer.

As another example of a feature that may be available from the retailer information screen 228, the user may also select the "buy now" button 238 to advance to the on-line shopping screen 260. The on-line shopping screen 260 may be created by the shopping application of the electronic device 10. Alternatively, user selection of the "buy now" button 238 may direct the user to an on-line shopping webpage of the retailer through a web application of the electronic device 10. In addition to the product picture 176 and production information elements 178, the on-line shopping screen 260 may also offer the user another on-line shopping feature. For example, the user may add the scanned item to a shopping cart by selecting the "add to cart" button 262. For another example, the user may advance to a purchasing window by selecting the "check out" button 264. For yet another example, the user may view other available products by selecting the "more shopping" button 266. Selection of the "more shopping" button 266 may advance the user to a home page of the retailer's on-line shopping website. Alternatively, selection of the "more shopping" button 266 may advance the user to another screen within the shopping application that features additional items available from that retailer, in which case, the electronic device 10 may send another information request to the data manager 92, requesting a list of other products available from the selected retailer.

Figure 13A:
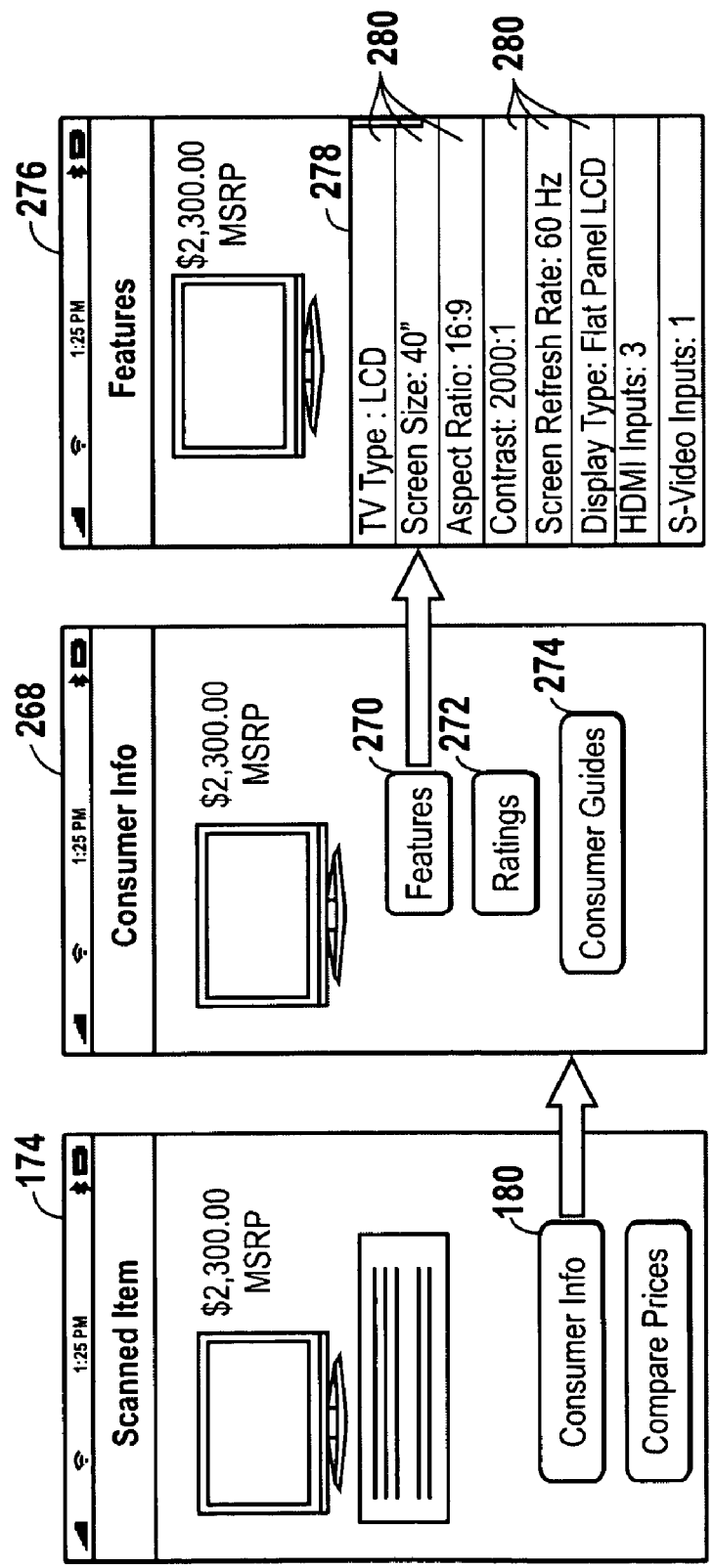
FIGS. 13A and 13B are front views of the device in FIG. 1, illustrating various methods of acquiring consumer information regarding a product in accordance with one embodiment.
Figure 13B:
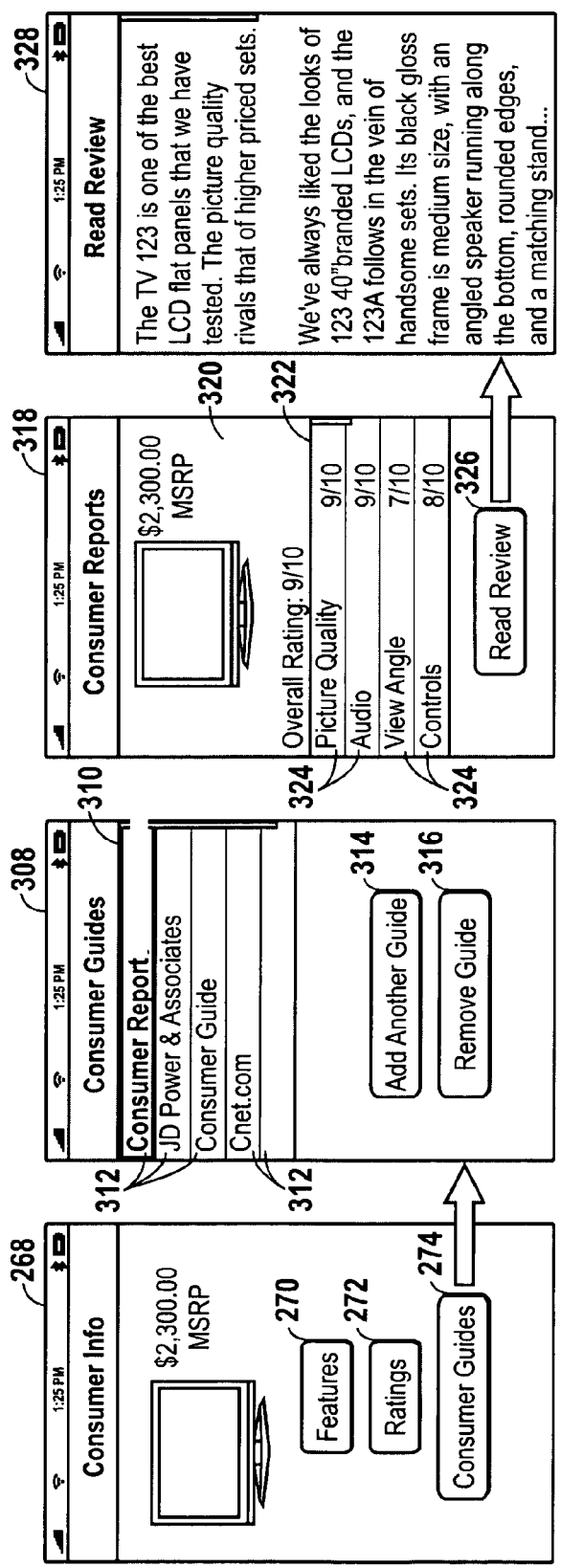
Figure 14:
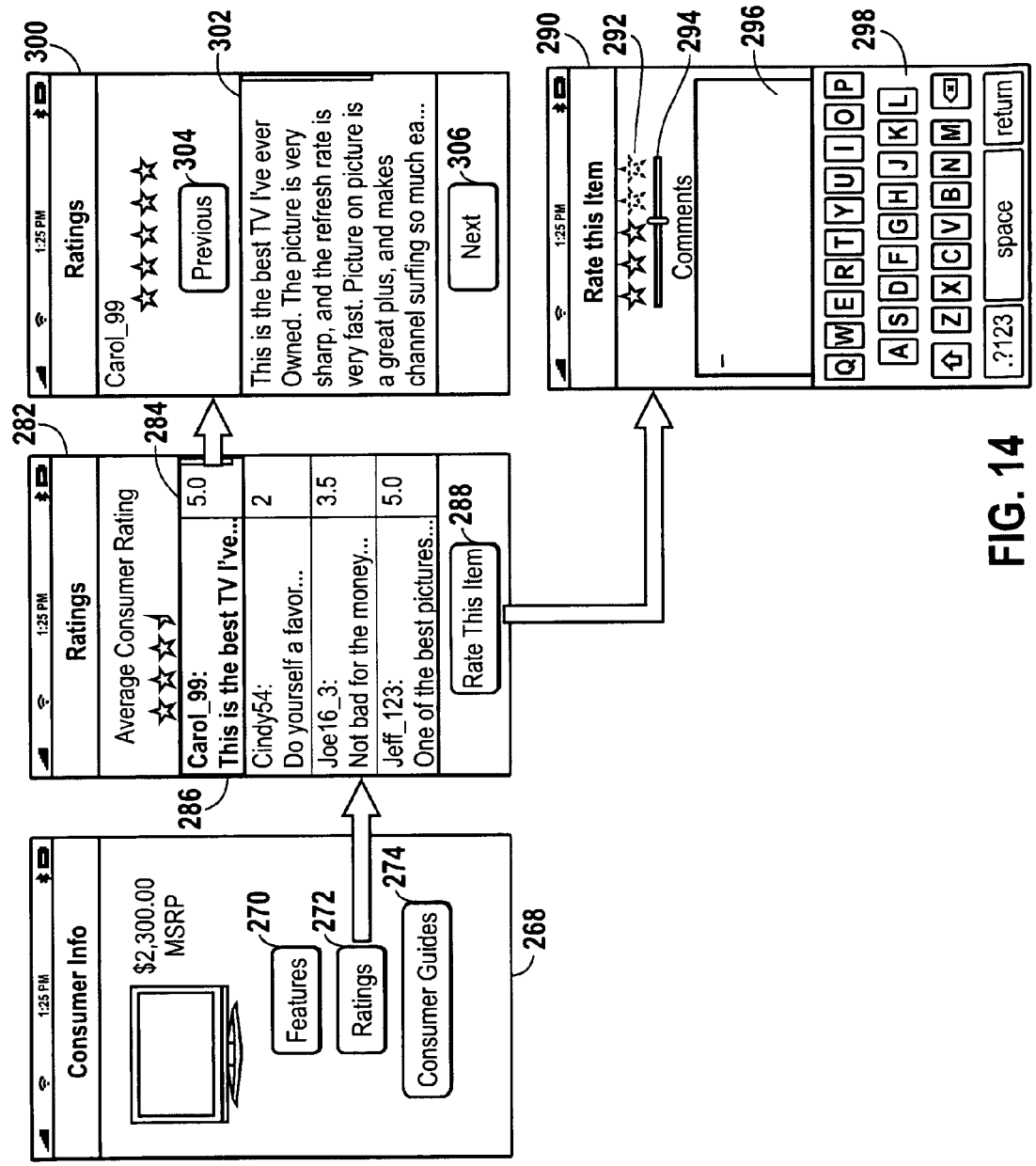
FIG. 14 is a front view of the device in FIG. 1, illustrating a method of generating product information in accordance with one embodiment.

Turning now to FIGS. 13A, 13B, and 14 methods of using an electronic device 10 to acquire and generate consumer information for a selected product are shown. Turning specifically to FIG. 13A and returning to the scanned item screen 174, a user may select the "consumer information" button to advance to the consumer information screen 268. The consumer information screen 268 may serve as a gateway to the consumer information features of the electronic device 10. For example, the consumer information screen 268 may allow a user to receive extensive information about product features by selecting the "features" button 270 and to obtain product ratings by selecting the "ratings" button 272 or the "consumer guide" button 274.

Regarding the "features" button 270, the user may select this button to advance to the product features screen 276. The product features screen 276 may include a product features list 278 that includes product feature entries 280. Selection of the "features" button 270 may initiate an information request by the electronic device 10. In accordance with the information request, the data manager 92 may assemble a data packet containing information obtained from the manufacturer database 94, such as product type, product dimensions, product weight, product pricing and other product specifications. The information included in the data packet may be product-type specific, such as screen size in the case of a television.

Turning to FIG. 13B and returning to the consumer information screen 268, a user may select the "consumer guides" button 274 to advance to a consumer guides selection screen 308. The consumer guides selection screen 308 may allow the user to acquire information from professional consumer guide organizations. Accordingly, the consumer guides selection screen 308 provides a consumer guide list 310 that includes one or more consumer guide entries 312. Selection of a particular consumer guide entry 312 will provide the user with the quality or rating information available from that particular organization for the scanned item. The consumer guide entries 312 may be preloaded into the device 10 at the factory and the user may also customize the consumer guide list 310 by using either the "add guide" button 314 or the "remove guide" button 316.

Selection of a consumer guide entry 312 may advance the user to a consumer guide screen 318, which details the consumer guide information available for the scanned item. The consumer guide screen 318 may include a data window 320 that provides any information that the consumer guide may provide for the scanned item. For example, the data window 320 may include such things as an overall rating of the product, an average retail price, and/or an indication of whether the consumer guide considers the product to be a worthwhile purchase. The consumer guide screen 318 may include a rating information list 322 with rating information entries 324. The rating information entries 324 may provide detailed information related to features of the product that have been tested or for which repair information or consumer opinions have been compiled. The consumer guide screen may also include a "read review" button 326 which may allow a user to read a professional review of the product.

Turning now to FIG. 14 and returning to the consumer information screen 268, the user may select the "ratings" button 272 to advance to the consumer ratings screen 282. The consumer ratings screen 282 may be used to access consumer ratings that have been compiled by other users of other electronic devices. Therefore, the consumer ratings screen 282 may include a consumer ratings list 284 which includes consumer ratings entries 286. The consumer rating entries 286 may identify a rater by displaying a unique user name and may show a segment of the rater's comments as well as an overall rating given by the rater.

In some embodiments, the electronic device 10 may also include a tool for users to submit a product rating. As shown in FIG. 14, selection of the "rate this item" button 288 will send the user to a rate item screen 290. The rate item screen 290 may include a rating selection element 294, such as a slider bar, and a rating indicator 292 for indicating the selected rating. To enter a comment, the rate item screen 290 may also include a comment window 296 and a keyboard 298. After submission of the rating and comment, the submission may be saved to a database that is accessible by other users, such as the consumer database 98, or some other database communicatively coupled to the data manger 92. In some embodiments, a user of the electronic device 10 may incur a small fee for obtaining a product rating, and/or may obtain a credit by submitting a product rating.

Furthermore, in some embodiments, the product information features described above may also include a side-by-side comparison of similar products. For example, in the consumer guide screen 318, consumer guide ratings for the scanned product may be displayed along with consumer guide ratings for products comparable to the scanned product. For another example, in the product features screen 276, product features for the scanned product may be displayed along with product features of similar products. By providing information on more than one product, the user may make a quick side-by-side comparison of similar products.

In addition to obtaining information for a single product, the electronic device 10 may also include methods of adding a product to a shopping list. Methods of generating and using a shopping list within the electronic device 10 are shown in FIGS. 15-20. As will be described further below, shopping lists may be entered into the electronic device 10 manually or by scanning a product as described above. Additionally, items in the shopping list may be associated with a product identifier or may simply be a generic or shorthand product name created by the user. The shopping lists may be used, in some embodiments, to remind the user to acquire certain items while at a store. Moreover, if a shopping list includes at least one shopping list entry that is associated with a product identifier, the shopping list may also be used to determine which retailer provides the best deal on certain items or the best overall deal on all of the items in the shopping list. In some embodiments, the shopping list may be used to schedule a regular delivery of products, such as groceries, through a delivery service. In some embodiments, a shopping list may be shared between several users and edited collaboratively.

Figure 15:
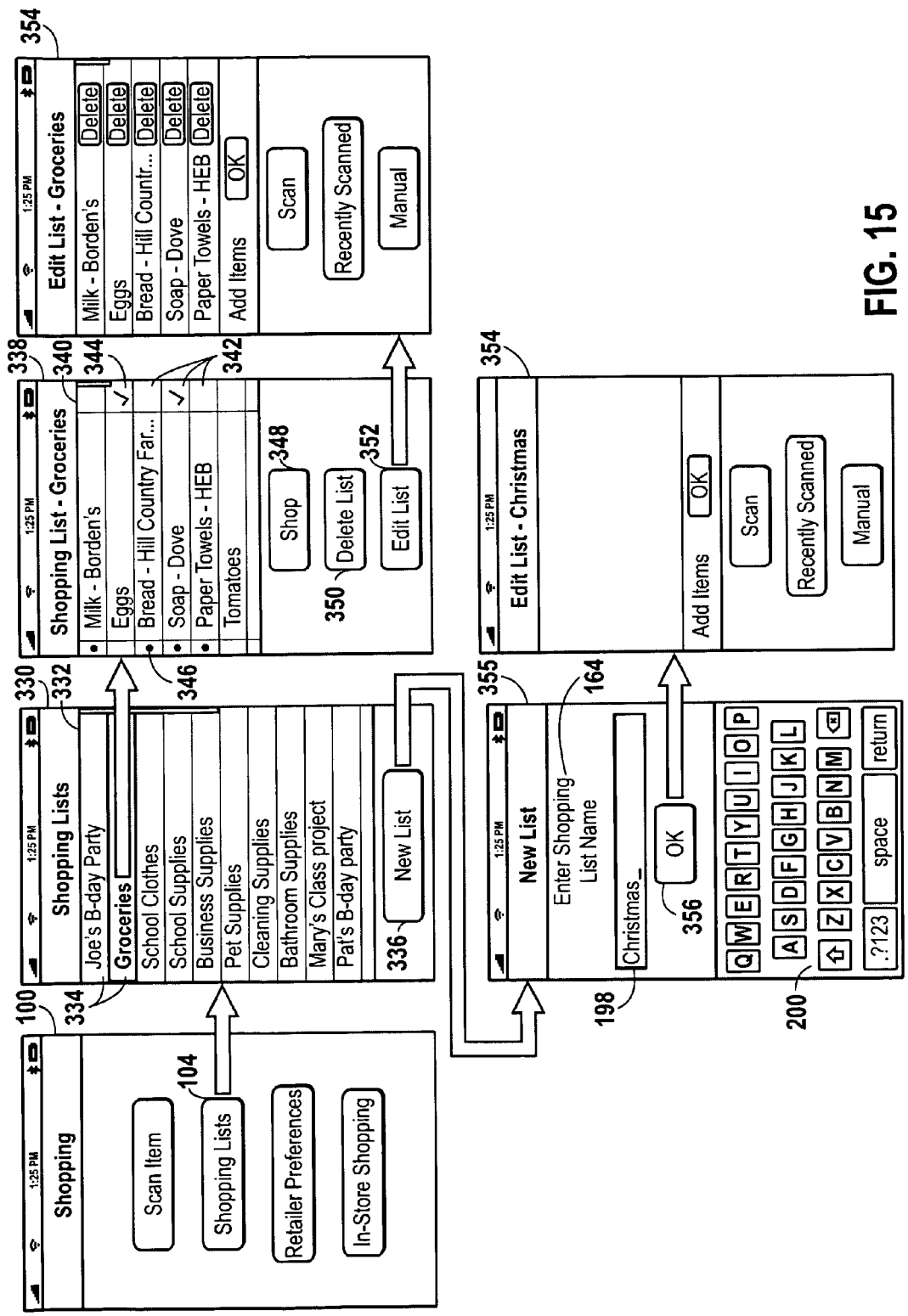
FIGS. 15, 16A, and 16B are front views of the device in FIG. 1, illustrating methods of generating and editing a shopping list in accordance with embodiments.
Figure 16A:
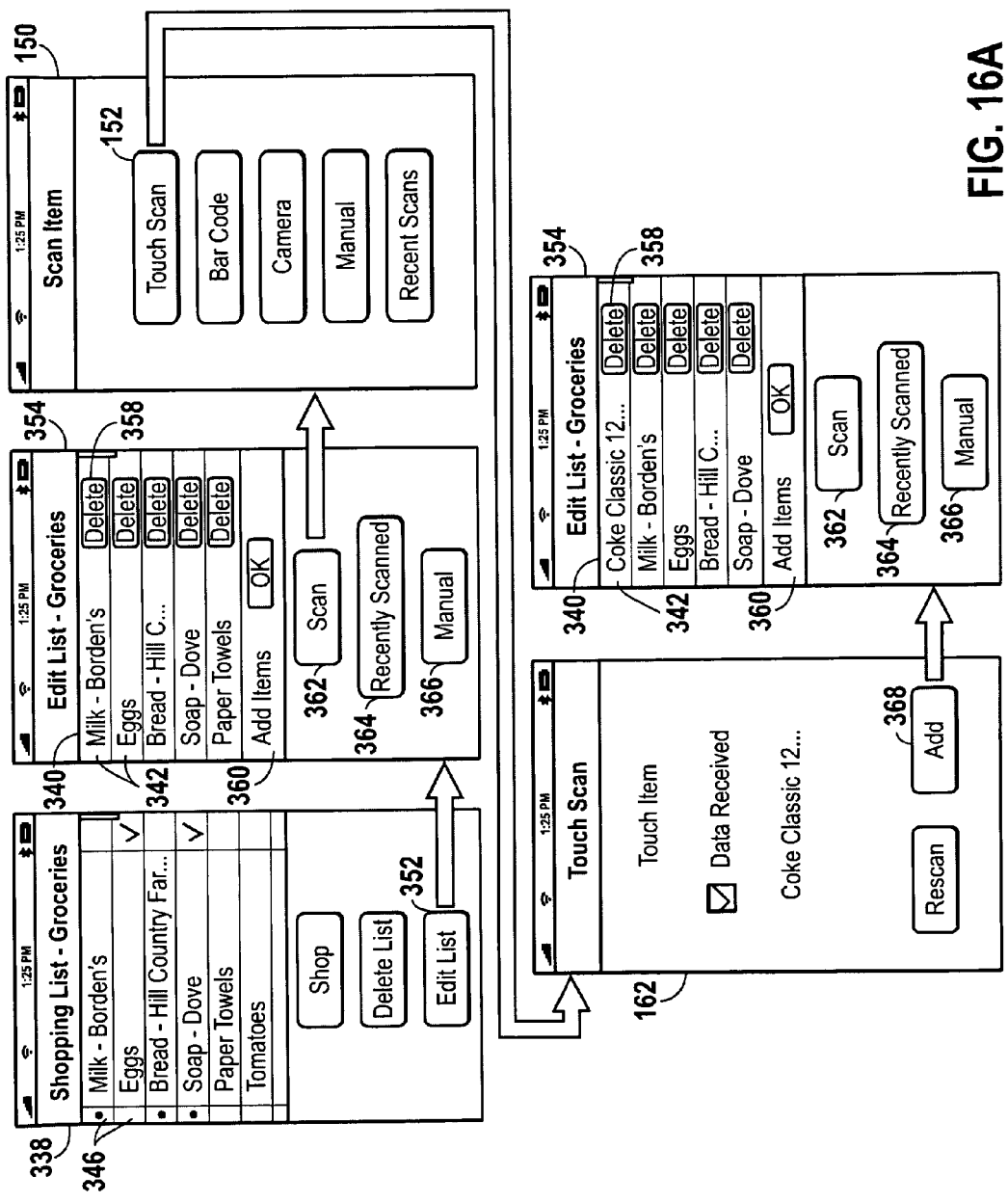
Figure 16B:
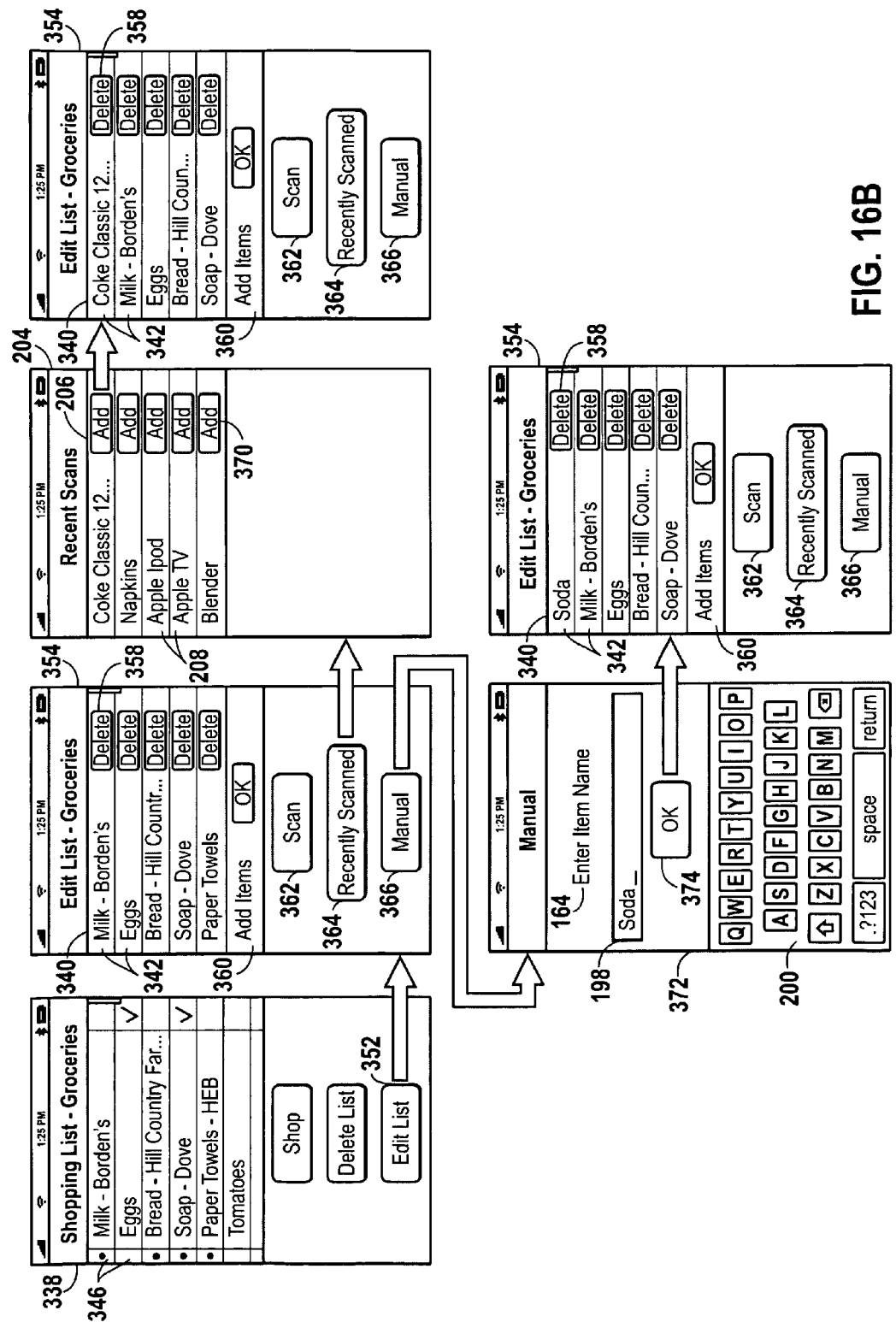

Turning to FIGS. 15, 16A, and 16B, methods of organizing, creating, and editing a shopping list are depicted in accordance with embodiments. Turning specifically to FIG. 15 and returning to shopping screen 100, a user may select a "shopping list" button 104 to advance to the shopping lists screen 330. Included in the shopping lists screen 330 may be a list 332 of shopping lists that the user has created. Selecting a shopping list entry 334 may advance the user to the shopping list screen 338. The shopping list screen 338 may include a shopping list 340 which includes product entries 342. The product entries 342 may include an indication of the product name or product type as well as other useful information. For example, a product entry 342 may include an attainment indicator 344 that indicates whether the user has purchased the item or placed the item within a shopping cart, for example. The user may toggle the attainment indicator 344 by selecting it. In addition, the attainment indicator 344 may toggle automatically upon buying the item through purchasing features of the electronic device 10.

The shopping list may be populated with various types of product entries, such as product-specific entries, type-specific entries, and generic entries, for example. A generic entry may be added to the shopping list by manually typing a generic name for a particular product and may serve as a reminder to purchase the item. However, because a product identifier is not specified, product information services may not be available for that product entry.

A product-specific entry may be added to the shopping list by scanning the product or manually entering a product identifier such as UPC code. By identifying a specific product, the user may use the product information services, such as the price comparison features, which will be described below. To differentiate between product-specific entries and generic entries, an entry type indicator 346 may be included in the product entries 342. The entry type indicator 346 may, therefore, remind the user about whether product information services are available for that item.

A type-specific entry is a product entry that is associated with a product identifier, when, in fact, the user is not committed to buying the specific product identified, but rather only a product of the same type. For example, a user may scan a bottle of salad dressing to conveniently add it to the shopping list 340 when, in fact, the user may willing to buy a different brand if it is cheaper. The brand flexibility of the user may have a significant effect in the outcome of the price comparison features of the electronic device 10, which will be explained further below. Therefore, the user may indicate this brand flexibility by identifying the scanned product as type-specific. Therefore, in some embodiments, the entry type indicator 346 may also serve to indicate whether the user desires to buy the specific product identified, or only products of the same type. In such embodiments, the user may toggle the entry type indicator 346 by selecting it after the scanned product has been entered into the shopping list.

Various features of the electronic device 10 may be available to the user from the shopping list screen 338. For example, by selecting the "shop" button, the user may access the product information services of the electronic device 10, which will be explained below. Additionally, the user may delete a shopping list 340 by selecting the "delete list" button 350 or edit a list by selecting the "edit list" button 352. As shown in FIG. 15, the user may advance to the edit list screen in two ways. First, the user may select the "edit list" button 352 from the shopping list screen 339, in which case, the user is advanced to the edit list screen 354. Secondly, the user may select the "new list" button 336 from the shopping lists screen 330, in which case, the user is advanced to the new list screen 355, where the user is prompted to enter a name for the new shopping list by the user instruction message 164. The new list screen 355 may also include the text entry box 198 and the keyboard interface 200 for entering the name of the new list. Selection of the "ok" button 356 then advances the user to the edit list screen 354.

Turning to FIG. 16A, a method for editing a new or existing shopping list by scanning items is shown. As described above, the user may advance to the edit list screen 354 by selecting the "edit list" button 352 while in the shopping list screen 338. Within the edit list screen 354, the user may add items to or delete items from the shopping list. The edit list screen 354 may include the shopping list 340 with product entries 342 shown substantially as they appear in the shopping list screen 338. The user may delete product entries 342 from the shopping list 340 by selecting the "delete" button 358 positioned adjacent to the product entry 342.

The edit list screen 354 may also include an add items window 360 which provides a variety of methods for adding product entries 342 to the shopping list 340. For example, a user may wish to add a product entry 342 to the shopping list 340 by scanning the product in accordance with the methods described in FIGS. 5-10 above. Accordingly, the user may advance to the scan item screen 150 by selecting the "scan" button 362. The user may then utilize all the methods included in electronic device 10 for identifying a product. In the example shown in FIG. 16, the user selects the "touch scan" button 152, advances to the touch scan screen 162 and scans the desired product. When the user is satisfied with the results of the scan, the user may select the "add" button 368, which adds the scanned item to the shopping list 340 and returns the user back to the edit list screen 354.

Turning to FIG. 16B, methods of adding items to a shopping list by browsing through a list of recent scans or entering an item manually are shown. The user may browse recent scans by selecting the recent scans button 160 from the scan screen 150. Additionally, to allow the user to access this feature with fewer button presses, the edit list screen 354 may also include a recent scans button 364. The user may then select the "recent scans" button 364 and advance to the recent scans screen 204, described above in relation to FIG. 10. When accessing the recent scans screen 204 from the edit list screen 354, the recent scans entries 208 may include "add" buttons 370, which allow the user to add the selected item to the shopping list. In some embodiments, selection of the "add" button 370 may also return the user back to the edit list screen 354.

To add a product name to the shopping list 340 manually, the user may select the "manual entry" button 366 to advance to the manual entry screen 372. The manual entry screen 372 may include user a instruction message 164, a text entry box 198, and keyboard interface 200 for typing the product type name. Selection of the "ok" button 374 adds the product name to the list and returns the user to the edit list screen 354. As discussed above, when a product name is added manually, the product entry 342 may include an indicator, such as the entry type indicator 346 that indicates that the product information services of the device 10 may not be available for that product entry 342.

Shopping lists may be saved in the storage memory 58 of the electronic device 10. Additionally, some or all shopping lists accessible to the electronic device 10 may be stored remotely, such as on the Internet 91. Furthermore, shopping lists stored on the Internet 91 may be shared between several users. A shared shopping list may be accessible on-line to a small group of users such as family members, room-mates, or co-workers allowing all of the users to edit the list. Because the shared list is stored on-line the shopping list may be edited through any web accessible device, such as the electronic device 10 or a personal computer.

Turning now to FIGS. 17 through 20, various product information services of the device 10 are shown in accordance with embodiments. Specifically, methods of bargain hunting for items in the shopping list are shown. The electronic device 10 may facilitate bargain hunting by allowing the user to search one or more retailers to obtain pricing information for each item in the shopping list. This information may then be presented to the user so that the user may make an informed decision regarding which retailer or retailers to visit to acquire the items on the list. Furthermore, embodiments may include any form of data presentation that helps a user to make an informed shopping decision. For example, the electronic device 10 may present the prices for individual products at a specific retailer, the total price for all of the products on the shopping list at a specific retailer, the travel distance to a retailer, the number of items that a retailer carries, special offers available through a retailer, the address or telephone number of a retailer, store hours, etc.

Figure 17:
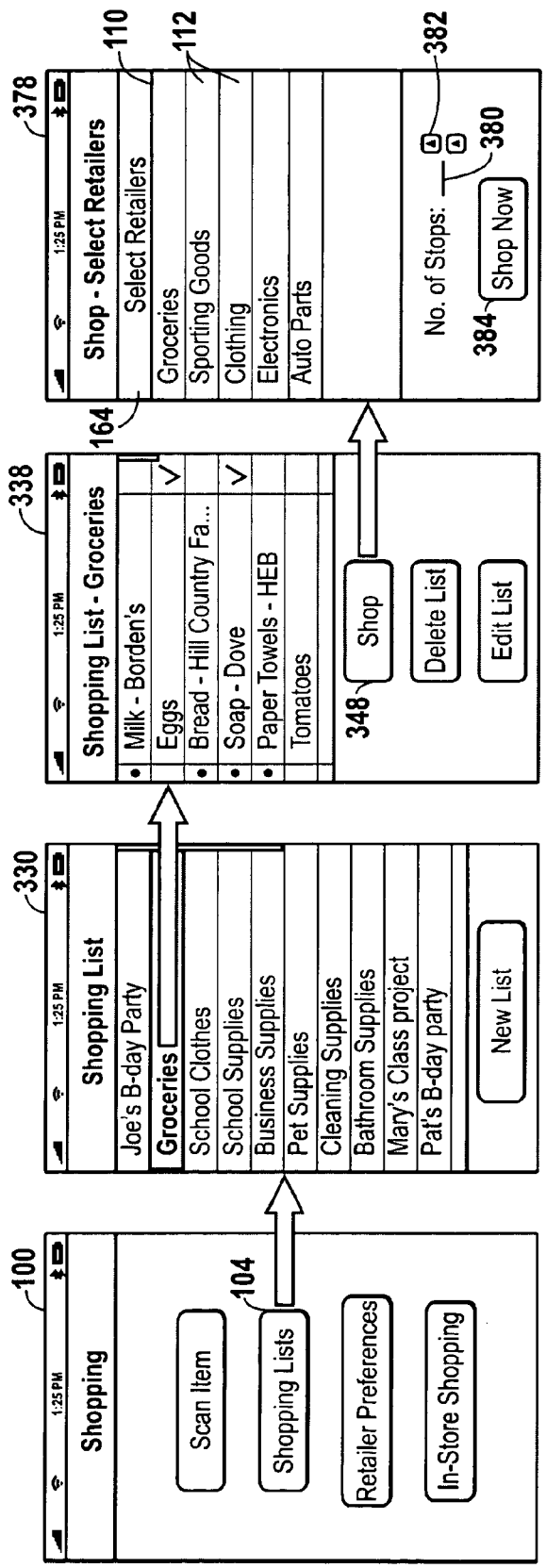
FIGS. 17-20 are front views of the device in FIG. 1, illustrating methods of comparing retailer prices for several products in a shopping list in accordance with embodiments.

Turning specifically to FIG. 17, a method of initiating a retailer search is shown. Before a retailer search is conducted, the device may use information regarding the search parameters or the type of data presentation that the user desires. Therefore, selecting the "shop" button 348 in the shopping list screen 338 may advance the user to a shop list screen 378 that prompts the user to enter the information. For example, the user may be prompted to select one or more retailers from the retailer categories list 110. As described above, in relation to FIG. 5, selection of one or more retailer categories 112 will identify the retailers that the user wishes to search. For another example, the shop list screen 378 may also include an indicator 380 by which the user may indicate the number of stops that the user is willing to make to obtain the items on the shopping list. The user may specify the desired number of stops by selecting the data entry elements 382. To initiate the search of retailers, the user may select the "shop now" button 384, which will advance the user to a screen that may vary according to the number of stops that the user indicated.

Figure 18:
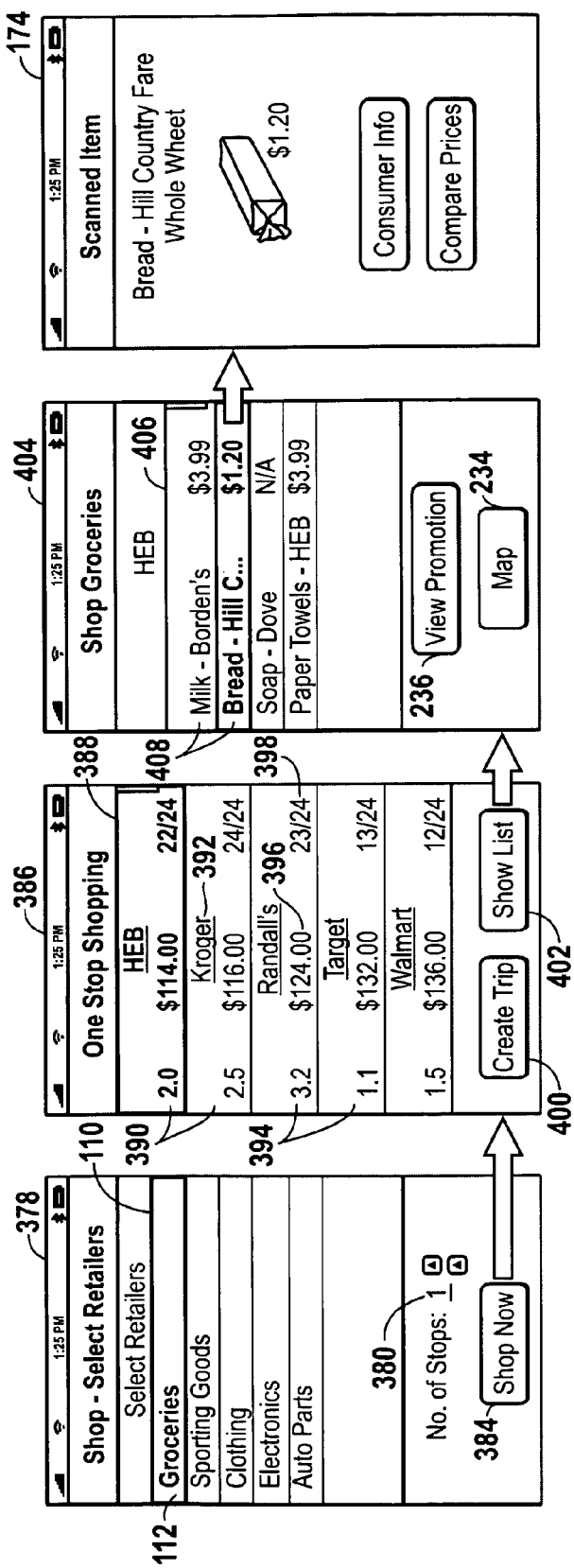
Figure 19:
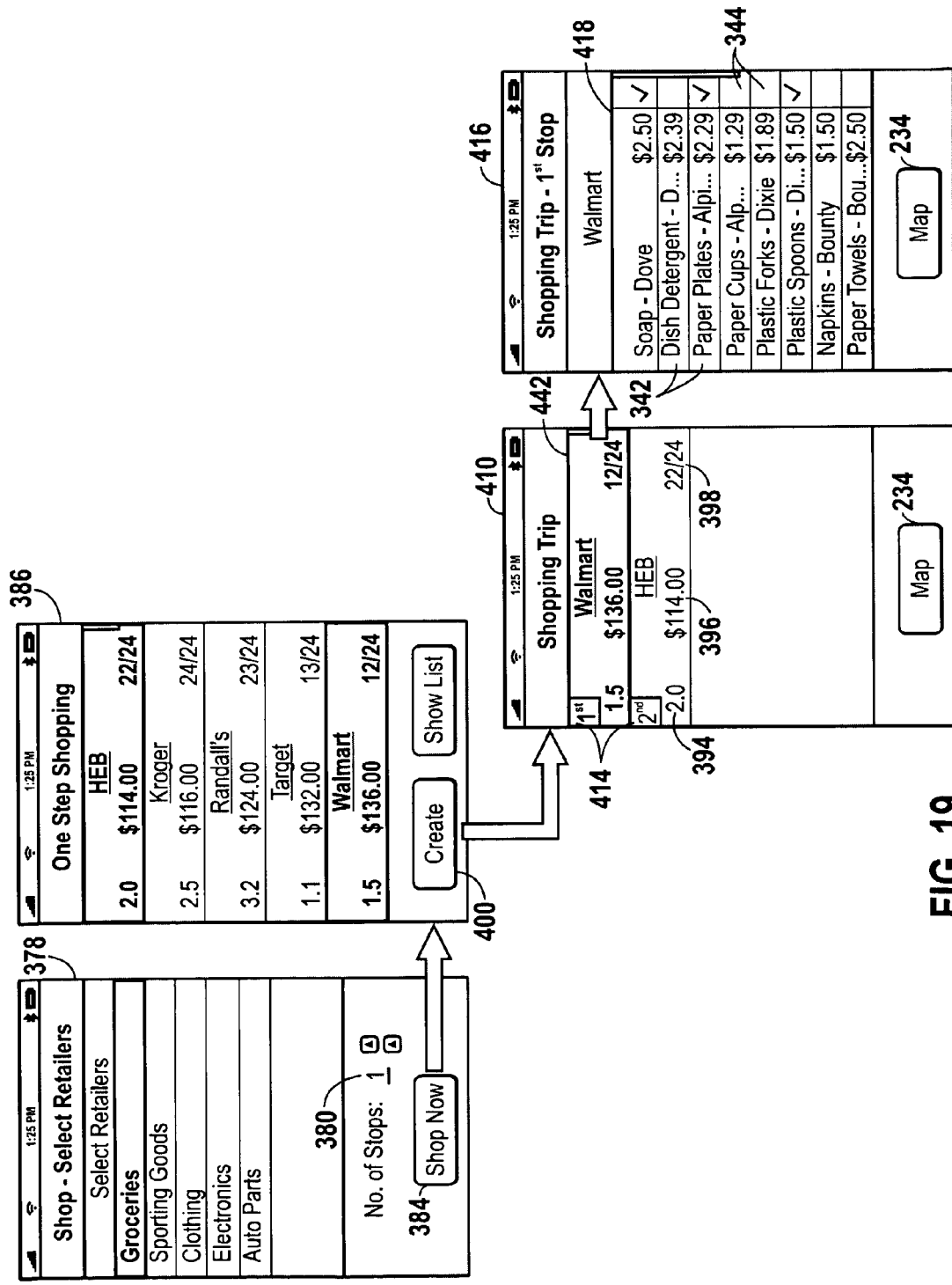

Turning now to FIGS. 18 and 19, methods of bargain hunting a shopping list wherein the user specifies one stop are shown. As shown in the shop list screen 378 of FIG. 18, the user has indicated a desire to make one stop, i.e. to visit one retailer, to obtain the items on the user's list. After selecting the "shop now" button 384, the electronic device 10 may initiate an information request to the data manager 92.

As part of the information request, the electronic device 10 may send a broad range of information to the data manager 92, including product identifiers for all items in the shopping list, the current location of the user, a home location specified by the user, retailer preferences as selected in the retailer category list 110, and a request ID that corresponds with the one-stop shopping feature of the electronic device 10. Using some or all of this information, the data manager 92 may then compile an array of retailer information by searching the retailer database 96 for retailers that fit within the search criteria specified. The retailer information may include pricing information for each retailer and each item in the shopping list.

The pricing information obtained by the data manager 92 may vary depending on how the product was entered into the shopping list 340. As stated above, the shopping list 340 may include a mix of product-specific entries, type-specific entries, and generic entries. For a product-specific entry, the data manager 92 obtains a product price that matches the identified product. However, for a type-specific entry, the data manager 92 may obtain the lowest price available for comparable items of the same type as the identified product. Additionally, if a price for a product entry 342 is unavailable, then a manufacturer recommended price may be substituted for an actual retail price in calculating the total price. In this way, the user will be able to make a meaningful price comparison between retailers that carry different items. For a generic entry, i.e. a shopping list entry that is not associated with a product identifier, pricing information may not be obtained.

In addition to obtaining pricing information, the data manager 92 may also derive secondary information, such as the total price for all of the items in the list at each retailer and/or the travel distance to the retailer, for example. The data manager may then send some or all of this information to the electronic device 10. In some embodiments, the data manager 92 may send only information pertaining to a limited number of retailers. For example, the data manager 92 may select retailers based on proximity to the user, lowest total price, availability of the greatest number of items on the user's shopping list, or other useful criteria, such as user preferences. Furthermore, user preferences may be provided by the user, or the data manager 92 or device 10 may include software designed to "learn" user preferences based on past product queries or online purchases, for example. Based on of these criteria or combinations thereof, the data manager 92 may then send only the most relevant retailer information back to the electronic device 10.

After the retailer information is received by the electronic device 10, the user may be advanced to the one-stop shopping screen 386. The one-stop shopping screen 386 may include a retailer list 388 with one or more retailer entries 390. Each of the retailer entries 390 may include one or more information elements for presenting useful information about the retailer. For example, a retailer entry 390 may include a retailer indicator 392 listing the particular retailer to which the information applies. The retailer entry 390 may also include a distance indicator 394, which may indicate a distance from the user's current geographical location to the geographical location of the retailer or a distance between the retailer and a home location specified by the user. The retailer entry 390 may also include an availability indicator 398, which may serve to indicate the number of items in the shopping list that are available through the retailer. Moreover, the retailer entry 390 may include a total price indicator 396 that may indicate the total price of all the products included in the shopping list.

The user may also acquire additional details about the list by selecting a particular retailer entry 390 and selecting the "show list" button 402, which will advance the user to the shopping list screen 404. The shopping list screen 404 may include a modified shopping list 406 with list entries 408. The modified shopping list 406 may provide different information compared to the original, user-specified shopping list 340 shown in the shopping list screen 338. For example, the list entries 408 may provide product information that pertains to the particular retailer selected, such as the retailer's listed price for the item. For another example, some of the items in the original shopping list 340 may be substituted with different products of the same product type. This product substitution may occur when, as stated above, the user creates a type-specific entry by toggling the entry type indicator 346 to indicate a lack of brand preference.

In some embodiments, the shopping list screen 404 may serve as a gateway to other shopping related features of the electronic device 10, which have been described hereinabove. For example, the shopping list screen 404 may include a "map" button 234, which allows the user to access the mapping features of the electronic device 10, as described in relation to FIG. 12. For another example, the shopping list screen 404 may also include a "view promotions" button 236 which allows the user to view special promotions from the retailer or download coupons, as also described in relation to FIG. 12. In addition, selection of a list entry 404 may advance the user to the scanned item screen 174, which allows the user to acquire product information for the selected item, as described above in relation to FIG. 11.

In some embodiments, the shopping list screen 404 may allow a user to purchase all of the items in the shopping list remotely. For example, the shopping list screen 404 may provide an option for directing the user to an on-line shopping webpage of the retailer through a web application of the electronic device 10, as shown in FIG. 12. Alternatively, the electronic device 10 may allow a user to send the shopping list to a delivery service, such as a grocery delivery service, for example. Additionally, the shopping list may pertain to consumable items that are to be replenished on a regular basis, such as food, household supplies, or office supplies, and the user may schedule regular deliveries of the items in the shopping list. The shopping list may be communicated to the delivery service and may include information regarding requested delivery dates. In some embodiments, the shopping list may be automatically communicated to the delivery service at a time interval specified by the user.

In some cases, after viewing the information available at the one-stop shopping screen 386, the user may wish to visit more than one of the retailers in the retailer list 388. Therefore, in some embodiments, the electronic device 10 may provide a tool for splitting the shopping list between two or more retailers and creating a multiple-stop shopping trip. In one embodiment, as shown in FIG. 19, the user may create a multiple-stop shopping trip by selecting two or more retailers from the retailer list 388 and then selecting the "create trip" button 400. After the user selects the "create trip" button 400, two or more partial shopping lists may be created by dividing the shopping list between the two or more retailers selected, according to which retailer offers the lowest price for each product in the shopping list, for example. The division of the shopping list may be carried out by the data manager 92, or by the electronic device 10.

After the division of the shopping list is accomplished, the user may be advanced to the shopping trip screen 410. The shopping trip screen 410 may include a destination list 412 with destination entries 414 that correspond with the retailers selected by the user at the one-stop-shopping screen 386. The order in which the retailers appear in the destination list 412 may be based on obtaining a short round trip distance between the retailers. The destination entries 414 may include a number of information elements, such as a distance indicator 394 that displays a distance between the retailer and the user of the electronic device 10 or between two retailers in the destination list 412. The destination entries 414 may also include a total price indicator 396 that shows the total price of the items in the partial shopping list for that retailer. The destination entries 414 may also include an availability indicator 398 that shows the number of items included in the partial shopping list for that retailer.

Upon selecting a destination entry 414, the user may advance to the destination screen 416, which includes the partial shopping list 418. As with the shopping list screen 338, the partial shopping list 418 may include product entries 342 and the attainment indicator 344. When visiting the retailer, the user may use the partial shopping list 418 as a reminder to purchase the items, and may select the attainment indicator 344 to mark certain items as having been obtained. If the user returns to the shopping list screen 338, the attainment indicator information specified by the user at the destination screen 416 may carry back to the shopping list screen 338.

At both the shopping trip screen 410 and the destination screen 416, the user may select the "map" button 234 to engage the map features of the electronic device 10, as described in FIG. 12. The information displayed on the map screen 240 may depend on which screen was active when the user selected the "map" button 234. For example, if the user selects the "map" button 234 from the shopping trip screen 410, the map element 246 may display each of the retailers included in the destination list 412, including a trace following the preferred route between the retailers to minimize travel time and/or distance. Alternatively, If the user selects the "map" button 234 from the destination screen 416, the map element 246 may show only the retailer displayed in the destination screen 416.

Figure 20:
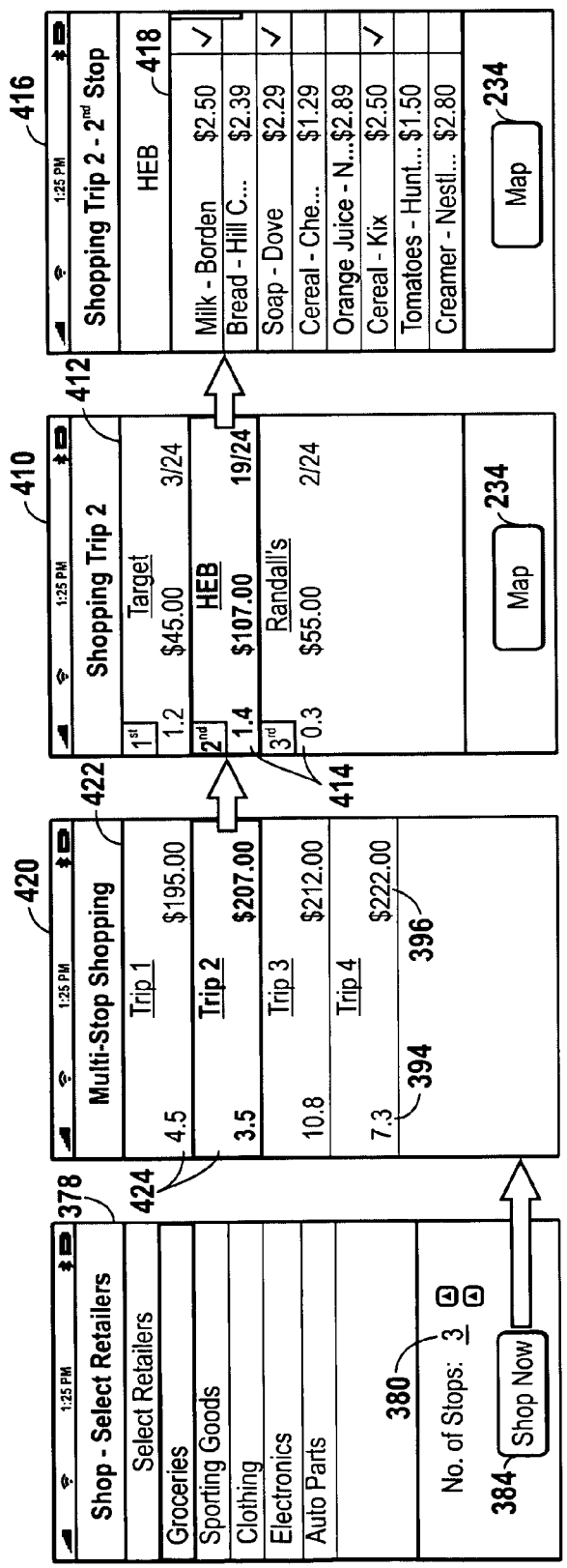

In some cases, the user may want to create a multiple-stop shopping trip without specifying which retailers should be included in the shopping trip, thereby allowing the electronic device 10 or data manager 92 greater flexibility to obtain the lowest total price. Turning to FIG. 20, another method of creating a multiple-stop shopping trip is shown, in accordance with embodiments. As shown in FIG. 20, the user may, from the shop list screen 378, input a number of stops greater than one before selecting the "shop now" button 384.

In some embodiments, selection of the "shop now" button 384 with a number of stops greater than one causes the electronic device 10 to send an information request packet to the data manager 92 that includes the complete shopping list, the selected retailers, and the maximum number of stops. The data manager 92 may then create one or more suggested shopping trips by dividing the list among two or more of the selected retailers, with the number of retailers per shopping trip not to exceed the number of stops that the user specified. In some embodiments, the data manager 92 may create a shopping trip for every possible combination of retailers selected by the user at the shop list screen 378. The data manager 92 may also calculate the total price for the items in the shopping list and the total distance that the user would travel in completing each suggested shopping trip. If the data manager creates a large number of shopping trips, the data manager may rank the shopping trips, according to total price, for example, and send only a certain number of higher ranked shopping trips back to the electronic device 10.

After the data manager 92 sends the shopping trip information to the electronic device 10, the electronic device 10 may then advance the user to the multi-stop shopping screen 420. The multi-stop shopping screen 420 may include a suggested trips list 422 with trip entries 424 for some or all of the shopping trips created by the data manager 92. The trip entries 424 may include various information elements that may be useful to the user. For example, the trip entries 424 may include a distance indicator 394 and/or a total price indicator 396. Furthermore, the trip entries 424 may be organized according to a criteria specified by the user, such as lowest total price. Upon selecting a particular trip entry 424, the user may advance to the shopping trip screen 410, which was described above in relation to FIG. 19. The user may then select a destination entry 414 to advance to the destination screen 416, which displays the partial shopping list 418.

While many of the shopping features described herein are controlled by the user, other features of the electronic device 10 may allow a manufacturer, retailer, or other advertiser to send shopping related information to the electronic device 10 without a specific request by the user for the information. In some embodiments, the electronic device 10 may briefly interject an advertisement window, such as the promotion screen 252, in response to a related selection of the user. For example, upon selection of the "buy now" button 238, as shown in the retailer information screen 228, the electronic device 10 may advance to promotions screen 252 or some other advertisement window before advancing to the online shopping screen 260. For another example, an advertisement window may also appear upon the identification of a particular product at the scan item screen 150. In various embodiments, the advertising window may appear at any time that a user makes a selection that identifies a particular product or retailer and may provide the advertiser an opportunity to attract the consumer's attention to its own related products or promotions. The advertisement window may include a message from the advertiser, which may be presented in the form of text, a picture, video, or audio.

Accordingly, the data manager 92 may store advertisement information within the manufacturer database 94 and/or the retailer database 96. The information stored in these databases may include the full advertisement as shown in the advertisement window or the database may include a web address to an on-line webpage, in which case the data manager 92 may send the web address to the electronic device 10 and link the user to the web address through the web application of the electronic device 10.

Embodiments are also directed to systems and methods wherein an individual store may create an enhanced in-store shopping experience for users of the electronic device 10. FIGS. 21-25 illustrate a system and methods for using an electronic device 10 to facilitate in-store shopping. In embodiments, the user may create a shopping list of store merchandise while browsing the store and may place an order and check out using the electronic device 10, as described further below.

Figure 21:
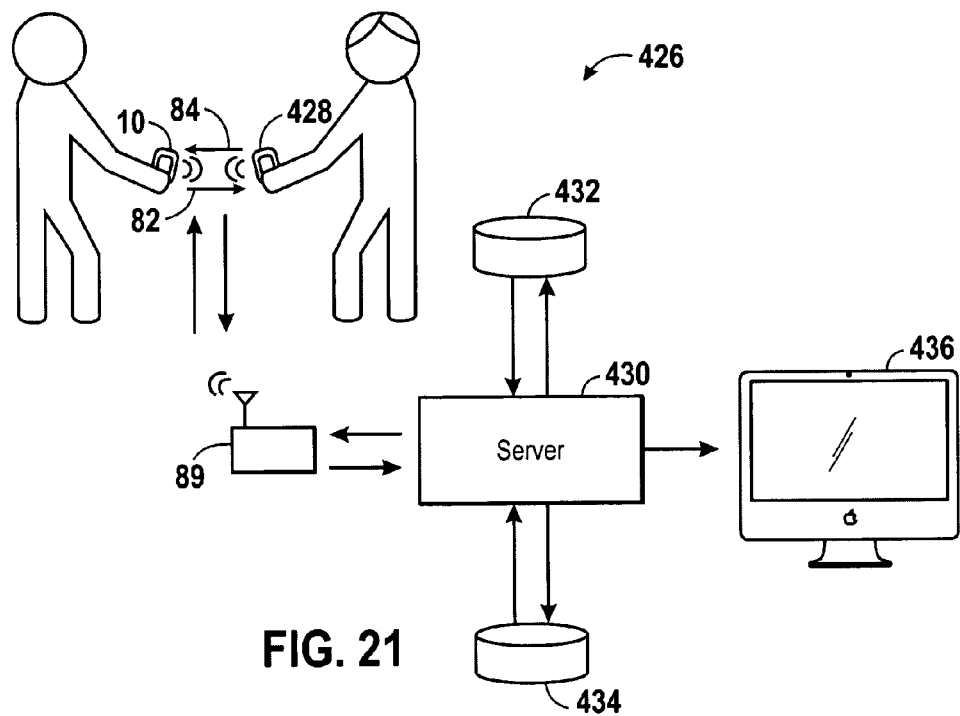
FIGS. 21 and 22 are diagrammatical representations of an in-store data transfer system in accordance with one embodiment.

Turning specifically to FIG. 21, a store-wide data transfer system 426 is shown in accordance with embodiments. The store-wide data transfer system 426 may allow a user of the electronic device 10 to access the shopping features offered by the store. To gain access to the store-wide data transfer system 426 the electronic device 10 may first communicate with the NFC device 428, which may be passive or active and may be controlled by a greeter, as shown in FIG. 21, or may be included in a customer information kiosk. In some embodiments, the NFC device 428 may be a model of an iPhone® available from Apple Inc. of Cupertino, Calif.

Using information acquired from the NFC device 428, the electronic device 10 may connect to a server 430 through the LAN 89. The server 430 may be coupled to one or more databases, including a store database 432. The store database may hold product information regarding merchandise available in the store, such as brand name, model number, serial number, SKU number, UPC code, product descriptions, store prices, locations in the store where products are located, the number of items in stock, media files related to specific products, etc. The store database may also include other store specific information such as a map of the store.

The server 430 may also be coupled to a consumer data base 434 that holds consumer related information such as billing information, contact information, shipping addresses, purchase orders and records regarding previous purchases, etc. Furthermore, the server may also be coupled to a display 436 that allows a purchase order of a customer to be displayed so that a store employee may process the order.

Figure 22:
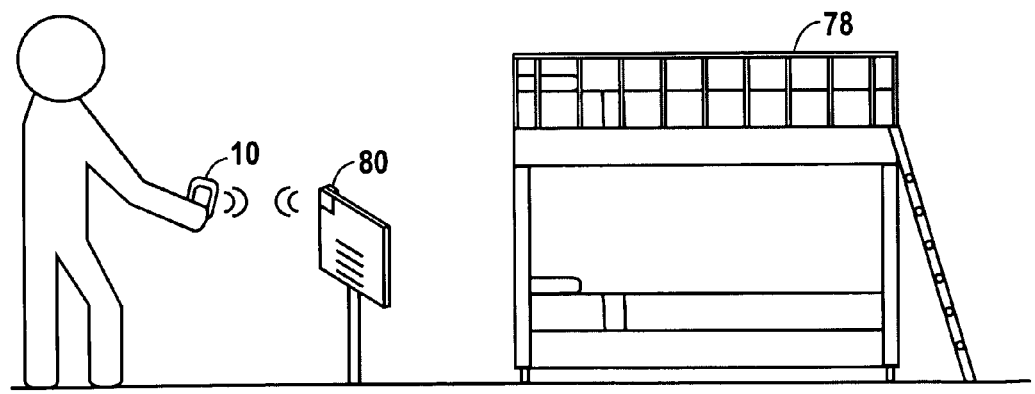

Turning to FIG. 22, a system for allowing a user to create a shopping list with the electronic device 10 is shown. To facilitate the addition of items to a shopping list, each product 78 throughout the store may be associated with an NFC device 80, such as an RFID tag. The NFC device 80 may be coupled directly to the product 78 or may be coupled to a product display element, such as a sign located in front of the product as shown in FIG. 22. The NFC communications between the electronic device 10 and the NFC device 80 may allow a user to acquire a product identifier related to the product 78, as previously described in relation to FIG. 4.

Figure 23:
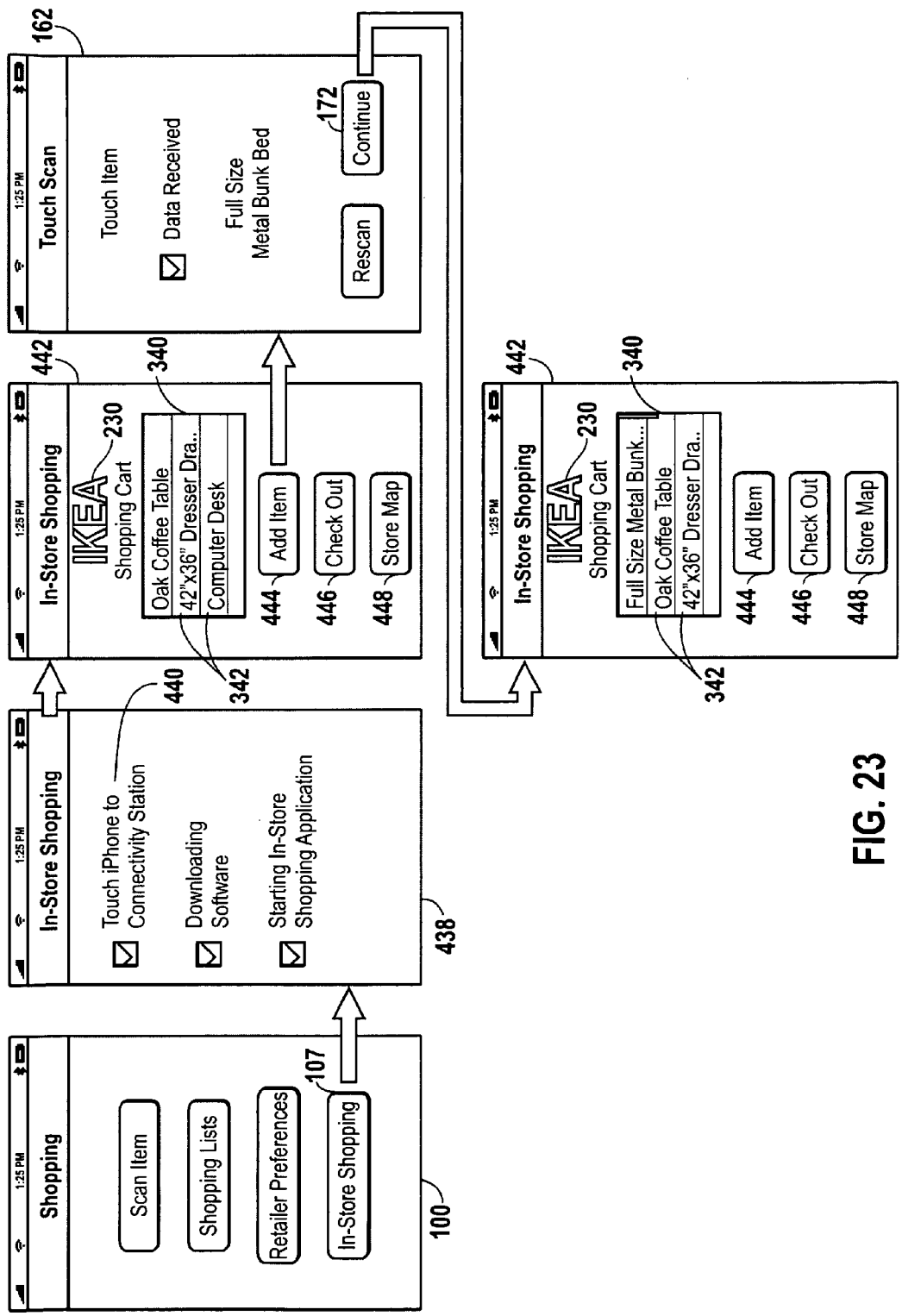
FIGS. 23-25 are front views of the device in FIG. 1, illustrating methods of providing in-store shopping features through the in-store data transfer system shown in FIGS. 21 and 22.

Turning to FIG. 23, a method of providing in-store shopping through the store-wide data transfer system 426 is shown in accordance with embodiments. As shown in FIG. 23, the user may access on the in-store shopping features of the electronic device 10 by selecting the "in-store" shopping button 107 from the shopping screen 100. Selection of the "in-store" shopping button 107 may turn on the NFC interface 50 of the electronic device 10 and advance the user to the message screen 438.

The message screen 438 may include a series of progress indicators 440. The first progress indicator 440 may instruct the user to touch the electronic device 10 to the store's NFC device 428. As shown in FIG. 21, the NFC interface 50 may then send an output signal 82 to the NFC device 428, requesting a connection to the store's LAN 89. In response, the NFC device 428 may transmit a return signal 84, which may carry networking information used to connect to the electronic device 10 to the store's LAN 89, such as a service set identifier (SSID), channel, and encryption key.

After acquiring the networking information, the first progress indicator 440 may provide feedback, informing the user of the success of the NFC communication, and the electronic device 10 may connect to the server 430. Once connected to the server 430, the electronic device 10 may provide information used to identify the electronic device 10 and distinguish it from other electronic devices of other customers in the store. Furthermore, the server 430 may load specialized software that includes the shopping tools offered by the store, as described below. Because the electronic device 10 communicates with the server 430 wirelessly, the user may move about the store while the software is downloaded. Meanwhile, the message screen 438 may display a progress indicator 440 informing the user that software is being downloaded.

After downloading the software from the server 430, the message screen 438 may provide appropriate feedback through the progress indicators 440 before advancing the user to the in-store shopping screen 442. In some embodiments, the in-store shopping screen 442 may include a retailer picture 230 and a shopping list 340 with product entries 342. After advancing to the in-store shopping screen 442, the user is then ready to start adding items to the shopping list 340.

When the user finds an item that he wishes to purchase, the user may select the "add item" button 444. Selection of the "add item" button 444 may turn on the NFC interface 50 and advance the user to the touch scan screen 162, which was described above in relation to FIG. 6. The user may then acquire a product identifier by touching the NFC interface 50 to the NFC device 80.

After the successful scan of the selected item, the item may be added to the shopping list 340 and the user returned to the in-store shopping screen 442. Scanning the item may also cause the electronic device 10 to initiate a request for product related information from the server. Such product related information may include a product description, product price, product picture, the number of products in stock, or any other information that may be obtained from the store database 432 for the product.

Figure 24:
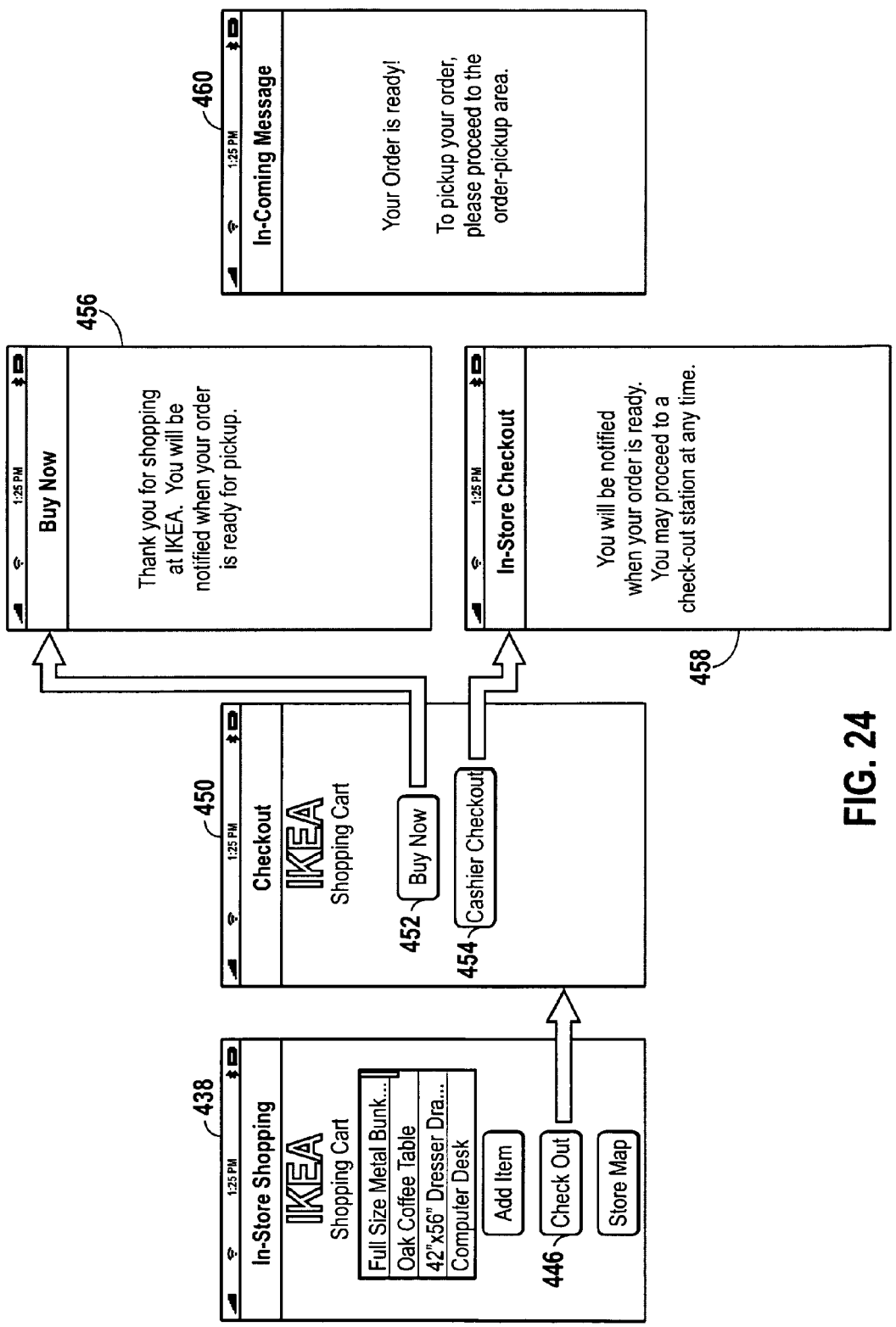

Turning now to FIG. 24, and returning to the in-store shopping screen 442, methods of purchasing the items in the shopping list 340 are shown in accordance with embodiments. From the in-store shopping screen 442 the user may select the "checkout" button 446, which may advance the user to the checkout screen 450. The checkout screen may provide various options by which the user may purchase the items in the shopping list 340. In some cases, the user may which to purchase items in the shopping list electronically. In that case, the user may select the "buy now" button 452, which causes the items to be purchased electronically.

After selecting the "buy now" button 452 the user may be prompted to enter payment information such as credit card information, debit card information, prepaid card information, or electronic check information, for example. In other embodiments, the consumer database 434 may already contain the required billing information. In yet other embodiments, the payment information may be stored on the electronic device and accessible to the shopping application, enabling a one-click checkout functionality. As such, the shopping application may display a list of payment options corresponding with payment information previously entered by the user into the electronic device 10. The payment information may be managed by a shared application that enables one-click checkout functionality regardless of the particular retailer. Methods of conducting an electronic purchasing transaction are described in the commonly assigned patent application titled, "Portable Point of Purchase Devices and Methods," by Gloria Lin et al., filed on Sep. 30, 2008, application Ser. No. 12/286,445 which is hereby incorporated by reference for all purposes.

In some cases, the user may wish to proceed to a cashier to checkout in person, which may be useful if the user wishes to pay in cash, for example. In that case, the user may select the "cashier checkout" button 454, in which case the user may be prompted to proceed to a checkout station.

Upon selection of the "cashier checkout" button 454 or the "buy now button" 452, the electronic device 10 may send a purchase request to the server 430. The purchase request may include product identifiers for each of the products in the shopping list 340. The server 430 may then create a purchase order and may send a list of the purchased items to the display 436. A store employee may then retrieve the products from stock and deliver the products to a pickup area.

Meanwhile, if the user selected the "buy now" button 452, the user may be advanced to the buy now screen 456, which may inform the user that the user's order is being processed and that the user will be notified when the order is ready for pickup. If the user selected the "cashier checkout" button, however, the user may be advanced to the "in-store checkout" screen 458, which instructs the user to proceed to a checkout station while the order is being processed.

When the order is ready for pickup, the server 430 may send a message to the electronic device 10. In response to the incoming message the user may be advanced to an in-coming message screen 460. In some embodiments, the in-coming message screen 460 may be a part of the text messaging application of the electronic device 10, in which case the message may be delivered through SMS text messaging. In other embodiments, the in-coming message screen 460 may be generated by the in-store shopping software. The in-coming message screen 460 may include a message informing the user that the user's order is ready for pickup.

Figure 25:
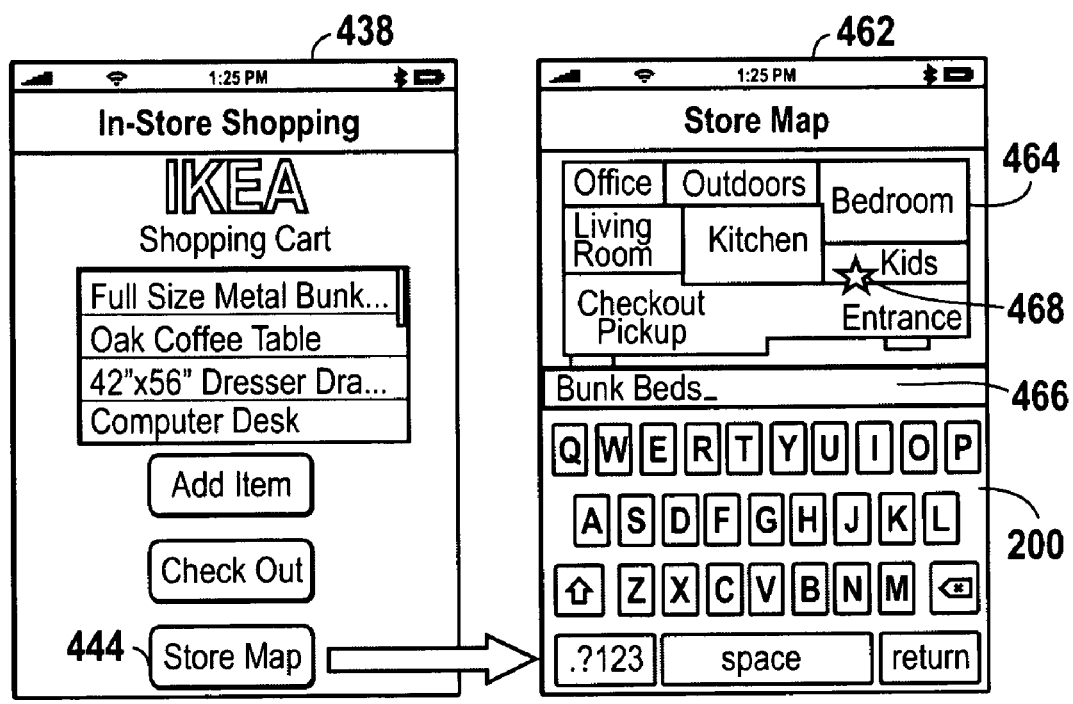

Turning now to FIG. 25 and returning to the in-store shopping screen 438, another feature of the in-store shopping application is shown in accordance with an embodiment. As shown in FIG. 25, various store related information may be accessible to the user from the in-store shopping screen 438. For example, in one embodiment, the in-store shopping screen may include a "store map" button, selection of which advances the user to a store map screen 462 that includes a store map 464. The store map may show the location of various items within the store. Additionally, the store map may be searchable. As such, the user may enter a product name into the text box 466 and the store map may identify the store location for the product with the location icon 468.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of operation of an electronic device to perform electronic shopping, comprising using an electronic device to:
    acquire a plurality of product identifiers corresponding with products to be purchased;
    add the product identifiers to a shopping list stored in the electronic device;
    transmit the shopping list to a data manager;
    receive retailer information from the data manager, the retailer information comprising a plurality of retailer identifiers that each identify a retailer that sells one or more of the products to be purchased and comprising product prices at each of the identified retailers for the products to be purchased;

receive a user input that specifies a numeric value representing a number of stops for acquiring the products to be purchased; and divide the shopping list into a number of partial shopping lists, wherein the number of partial shopping lists is determined based on the number of stops specified by a user of the electronic device and is equal to or less than the number of stops specified by the user of the electronic device, and wherein each partial shopping list is associated with a different retailer selected from the identified retailers and comprises one or more of the product identifiers.

2. The method of claim 1, wherein using an electronic device to acquire one or more product identifiers comprises receiving the one or more product identifiers through a near field communication interface of the electronic device.

3. The method of claim 1, wherein using an electronic device to acquire one or more product identifiers comprises receiving a user input that enters the one or more product identifiers into the electronic device.

4. The method of claim 1, wherein using an electronic device to receive a user input that specifies a numeric value comprises receiving a user input that increases or decreases an existing numeric value shown on a display of the electronic device.

5. The method of claim 1, wherein using an electronic device to divide the shopping list comprises dividing the shopping list into two or more partial shopping lists.

6. The method of claim 1, wherein using an electronic device to divide the shopping list comprises selecting the associated retailers to provide a lowest total price for the products to be purchased.

7. The method of claim 1, wherein using an electronic device to divide the shopping list comprises selecting the associated retailers to provide a shortest total travel time or a shortest total travel distance between the associated retailers.

8. The method of claim 1, wherein using an electronic device to divide the shopping list comprises receiving the partial shopping lists from the data manager.

9. A handheld electronic device, comprising:
a product identification device configured to acquire a product identifier corresponding with a product to be purchased by a user of the handheld electronic device;
a memory comprising a software application configured to allow the user to turn on the product identification device, obtain the product identifier, and store the product identifier to a shopping list;
a wireless networking interface configured to transmit the shopping list to a data manager via a wireless network and receive product information associated with the shopping list from the data manager for a plurality of retailers, wherein the product information comprises a plurality of total prices for all of the products in the shopping list and wherein each total price corresponds to a different retailer of the plurality of retailers and comprises a total cost for all the products in the shopping list at the corresponding retailer;
data processing circuitry capable of generating a plurality of shopping trips based on the product information, wherein each of the plurality of shopping trips corresponds to a different retailer of the plurality of retailers and comprises the total cost for all of the products in the shopping list available at the corresponding retailer; and
a display configured to display the shopping list and the plurality of shopping trips.

10. The handheld electronic device of claim 9, comprising a positioning device configured to determine a geographical position of the handheld electronic device, wherein the handheld electronic device is configured to transmit the geographical position of the handheld electronic device to the data manager via the wireless network and to receive the product information pertaining to one or more retailers of the plurality of retailers located within a specified distance from the position of the handheld electronic device.

11. The handheld electronic device of claim 10, wherein the handheld electronic device is configured to receive a plurality of travel distances each corresponding to a different retailer of the plurality of retailers, and wherein each of the plurality of shopping trips comprises the travel distance between the corresponding retailer and the geographical position of the handheld electronic device.

12. The handheld electronic device of claim 9, wherein the plurality of retailers are specified by the user of the electronic device.

13. The handheld electronic device of claim 9, wherein the product identification device comprises a near field communication interface.

14. The handheld electronic device of claim 9, comprising a user interface configured to receive a user input that selects a shopping trip from the plurality of shopping trips, wherein the data circuitry is capable of generating a modified shopping list comprising individual prices for each of the products available at the retailer corresponding to the selected shopping trip, and wherein the display is configured to display the modified shopping list.

* * * * *